United States Patent
Wang et al.

(10) Patent No.: US 11,978,485 B2
(45) Date of Patent: May 7, 2024

(54) VIDEO PROCESSING METHOD AND APPARATUS, AND ELECTRONIC DEVICE AND STORAGE MEDIUM

(71) Applicant: BEIJING BYTEDANCE NETWORK TECHNOLOGY CO., LTD., Beijing (CN)

(72) Inventors: Yan Wang, Beijing (CN); Shu Liu, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 16 days.

(21) Appl. No.: 17/627,578

(22) PCT Filed: Jul. 3, 2020

(86) PCT No.: PCT/CN2020/100263
§ 371 (c)(1),
(2) Date: Jan. 14, 2022

(87) PCT Pub. No.: WO2021/008394
PCT Pub. Date: Jan. 21, 2021

(65) Prior Publication Data
US 2022/0358966 A1  Nov. 10, 2022

(30) Foreign Application Priority Data
Jul. 15, 2019  (CN) .......................... 201910637404.4

(51) Int. Cl.
G11B 27/036  (2006.01)
G11B 27/10  (2006.01)

(52) U.S. Cl.
CPC ............ *G11B 27/036* (2013.01); *G11B 27/10* (2013.01)

(58) Field of Classification Search
None
See application file for complete search history.

(56) References Cited

U.S. PATENT DOCUMENTS 7,512,886 B1  3/2009  Herberger et al.
9,620,169 B1*  4/2017  Nolan .................. G11B 27/038
(Continued)

FOREIGN PATENT DOCUMENTS

CN  102427507 A  4/2012
CN  102547141 A  7/2012
(Continued)

OTHER PUBLICATIONS

International Patent Application No. PCT/CN2020/100263; Int'l Written Opinion and Search Report; dated Sep. 16, 2020; 9 pages.

*Primary Examiner* — Heather R Jones
(74) *Attorney, Agent, or Firm* — BakerHostetler

(57) ABSTRACT

The present invention provides a video processing method and apparatus, and an electronic device and a storage medium. The video processing method comprises: obtaining video materials; obtaining an audio material; determining music points of the audio material, and extracting video segments from each of the video materials according to the music points; stitching the extracted video segments to obtain a composite video; and adding the audio material to an audio track of the composite video to obtain a target video. The present invention improves the efficiency of producing a rhythmic video and reduces production costs.

18 Claims, 12 Drawing Sheets

(56) References Cited

U.S. PATENT DOCUMENTS

| | | | |
|---|---|---|---|
| 2009/0307207 A1* | 12/2009 | Murray | G11B 27/105 707/999.005 |
| 2013/0236102 A1 | 9/2013 | Hung et al. | |
| 2017/0026719 A1 | 1/2017 | Zhiwen | |

FOREIGN PATENT DOCUMENTS

| | | | |
|---|---|---|---|
| CN | 106210902 | A | 12/2016 |
| CN | 107124624 | A | 9/2017 |
| CN | 107360383 | A | 11/2017 |
| CN | 107393569 | A | 11/2017 |
| CN | 107483843 | A | 12/2017 |
| CN | 108028054 | A | 5/2018 |
| CN | 108111909 | A | 6/2018 |
| CN | 108566519 | A | 9/2018 |
| CN | 109168084 | A | 1/2019 |
| CN | 109257545 | A | 1/2019 |
| CN | 110265057 | A | 9/2019 |
| CN | 110336960 | A | 10/2019 |
| CN | 110933487 | A | 3/2020 |
| CN | 111065001 | A | 4/2020 |
| JP | H11-069290 | A | 3/1999 |
| JP | 2003-259302 | A | 9/2003 |
| JP | 2007-248895 | A | 9/2007 |

* cited by examiner

VIDEO PROCESSING METHOD AND APPARATUS, AND ELECTRONIC DEVICE AND STORAGE MEDIUM

CROSS REFERENCE OF RELATED APPLICATION

The present application is the national phase application of International Patent Application No. PCT/CN2020/100263, titled "VIDEO PROCESSING METHOD AND APPARATUS, AND ELECTRONIC DEVICE AND STORAGE MEDIUM", filed on Jul. 03, 2020, which claims the priority to Chinese Patent Application No. 201910637404.4, titled "VIDEO PROCESSING METHOD AND APPARATUS, AND ELECTRONIC DEVICE AND STORAGE MEDIUM", filed on Jul. 15, 2019 with the Chinese Patent Office, both of which are incorporated herein by reference in their entireties.

FIELD

The present disclosure relates to the field of video technologies, and in particular to a video processing method, a video processing apparatus, an electronic device, and a storage medium.

BACKGROUND

With the development of video processing technologies, video processing applications have been widely used in various scenarios as common applications on terminals. When processing videos, a user often requires synchronizing the videos to beats. A beat sync video is composed of at least two video segments, and transitions between video segments occur at strong beats in the audio, achieving a good play effect.

In the solution according to the conventional technology, as shown in FIG. 3, the user generally listens to the audio repeatedly, finds out the timestamps where the strong beats in the audio are located, and clips the video by counting seconds. For example, if the user finds out a first time stamp at 1.2 seconds in the audio, the user needs to manually crop a segment having a duration of 1.2 seconds from a first video; if a second time stamp in the audio is at 2.7 seconds, the user need to manually crop a segment having a duration of 1.5 seconds from a second video, and so on in a similar manner. As can be seen, in the solution according to the conventional technology, the user needs to repeatedly listen to the audio and manually clip the video, resulting in low efficiency and high cost in producing the beat sync video.

SUMMARY

The summary is provided to introduce in a simplified form a selection of concepts that are further described below in the embodiments. The summary is not intended to identify key or critical elements of the claimed technical solution, or to limit the scope of the claimed technical solution.

In a first aspect, a video processing method is provided according to an embodiment of the present disclosure, the method including:
obtaining video materials;
obtaining an audio material;
determining music points of the audio material, and extracting a video segment from each of the video materials according to the music points;
splicing extracted video segments to obtain a synthesized video; and
adding the audio material to an audio track of the synthesized video to obtain a target video.

In the above solution, the determining music points of the audio material, and extracting a video segment from each of the video materials according to the music points includes:
determining beat points and note starting points in the audio material, and combining and de-duplicating the beat points and the note starting points to obtain the music points;
updating the music points according to the number of the video materials, and determining time intervals between adjacent music points as music intervals;
extracting, from each of the video materials, a video segment corresponding to one of the music intervals.

In the above solution, the extracting, from each of the video materials, a video segment corresponding to one of the music intervals includes:
extracting at least one candidate video segment from each of the video materials according to the music intervals;
selecting one of the at least one candidate video segment extracted from each of the video materials, and stitching selected candidate video segments to obtain a combined segment, until candidate video segments extracted from the video materials are traversed to obtain all possible combined segments;
determining a score of each of the combined segments; and
determining one of the combined segments with a highest score, and determining candidate video segments in the combined segment as video segments to be spliced to obtain the synthesized video.

In the above solution, the extracting at least one candidate video segment from each of the video materials according to the music intervals includes:
for each of the video materials, traversing candidate video segments having durations meeting one of the music intervals;
determining scores of the candidate video segments in the video material; and
extracting at least one candidate video segment that meets a set score condition from the video material.

In the above solution, before the selecting one of the at least one candidate video segment extracted from each of the video materials, and stitching selected candidate video segments to obtain a combined segment, the method further includes:
in a case that the candidate video segment does not match one of the music intervals corresponding to the candidate video segment, adjusting a frame rate of the candidate video segment, to cause a duration of the candidate video segment having the adjusted frame rate to be consistent with the music interval.

In the above solution, the updating the music points according to the number of the video materials includes:
in a case that the number of the music points is consistent with the number of the video materials, keeping the music points unchanged;
in a case that the number of the music points is less than the number of the video materials, adding a new music point to the music points; and
in a case that the number of the music points is greater than the number of the video materials, pruning the music points.

In the above solution, before the combining and de-duplicating the beat points and the note starting points, the method further includes:
  determining a sound intensity of each of the beat points, and filtering out a beat point having a sound intensity lower than a sound intensity threshold.

In the above solution, the obtaining video materials includes:
  in response to a selection operation for candidate video materials,
  in a case that a duration of a selected candidate video material is out of a duration limitation range, presenting a prompt of duration limitation range not satisfied, and continuing to receive a new selection operation; and
  in a case that a duration of a selected candidate video material is within a duration limitation range, determining the candidate video material as the video material for extracting the video segment.

In the above solution, the obtaining a video material includes:
  determining the number of music points of each of at least two candidate audio materials; and
  determining one of the candidate audio materials of which the number of music points corresponds to the number of the video materials as the audio material to be added to the audio track of the synthesized video.

In the above solution, after the adding the audio material to an audio track of the synthesized video to obtain a target video, the method further includes:
  in response to a replacement operation for a video segment in the target video, replacing the video segment with a selected video segment in a corresponding video material, where the replaced video segment has a same duration as the selected video segment;
  in response to an operation of adding a video material, generating a new target video based on the audio material, the newly added video material, and the video materials corresponding to the target video;
  in response to the operation of deleting a video material, deleting a video material that is selected and that corresponds to the target video, and generating a new target video based on the audio material and video materials corresponding to the target video except for the deleted video material; and
  in response to an operation of updating an order of some video materials, updating the order of the video materials corresponding to the target video, and generating a new target video based on the audio material and the video materials in the updated order.

In the above solution, after the obtaining an audio material, the method further includes:
  in a case that a total duration of the video materials is less than or equal to a duration of the audio material, cropping the audio material according to the total duration of the video materials, to cause the duration of the audio material to be less than the total duration of the video materials.

In the above solution, the splicing extracted video segments to obtain a synthesized video includes:
  in a case that, in the extracted video segments, the number of horizontal video segments is greater than or equal to the number of vertical video segments, adding a background to each of the vertical video segments, and splicing the extracted video segments to obtain the synthesized video; and
  in a case that, in the extracted video segments, the number of vertical video segments is greater than the number of horizontal video segments, trimming frames of each of the horizontal video segments, and splicing the extracted video segments to obtain the synthesized video.

In the above solution, the obtaining video materials includes:
  obtaining at least two video materials submitted by a user; or
  obtaining a selected video material, and cropping the selected video material into at least two video materials.

In a second aspect, a video processing apparatus is provided, which includes:
  a video obtaining unit, configured to obtain video materials;
  an audio obtaining unit, configured to obtain an audio material;
  a music point determination unit, configured to determine music points of the audio material, and extract a video segment from each of the video materials according to the music points;
  a splicing unit, configured to splice extracted video segments to obtain a synthesized video; and
  an audio adding unit, configured to add the audio material to an audio track of the synthesized video to obtain a target video.

In the above solution, the music point determination unit is further configured to:
  determine beat points and note starting points in the audio material, and combine and de-duplicate the beat points and the note starting points to obtain the music points;
  update the music points according to the number of the video materials, and determine time intervals between adjacent music points as music intervals;
  extract, from each of the video materials, a video segment corresponding to one of the music intervals.

In the above solution, the extracting, from each of the video materials, a video segment corresponding to one of the music intervals includes:
  extracting at least one candidate video segment from each of the video materials according to the music intervals;
  selecting one of the at least one candidate video segment extracted from each of the video materials, and stitching selected candidate video segments to obtain a combined segment, until candidate video segments extracted from the video materials are traversed to obtain all possible combined segments;
  determining a score of each of the combined segments; and
  determining one of the combined segments with a highest score, and determining candidate video segments in the combined segment as video segments to be spliced to obtain the synthesized video.

In the above solution, the extracting at least one candidate video segment from each of the video materials according to the music intervals includes:
  for each of the video materials, traversing candidate video segments having durations meeting one of the music intervals;
  determining scores of the candidate video segments in the video material; and
  extracting at least one candidate video segment that meets a set score condition from the video material.

In the above solution, before the selecting one of the at least one candidate video segment extracted from each of the video materials, and stitching selected candidate video segments to obtain a combined segment, the apparatus is further configured to:

in a case that the candidate video segment does not match one of the music intervals corresponding to the candidate video segment, adjust a frame rate of the candidate video segment, to cause a duration of the candidate video segment having the adjusted frame rate to be consistent with the music interval.

In the above solution, the updating the music points according to the number of the video materials includes:

in a case that the number of the music points is consistent with the number of the video materials, keeping the music points unchanged;

in a case that the number of the music points is less than the number of the video materials, adding a new music point to the music points; and in a case that the number of the music points is greater than the number of the video materials, pruning the music points.

In the above solution, before the combining and de-duplicating the beat points and the note starting points, the apparatus is further configured to:

determine a sound intensity of each of the beat points, and filter out a beat point having a sound intensity lower than a sound intensity threshold.

In the above solution, the video obtaining unit is further configured to:

in response to a selection operation for candidate video materials, in a case that a duration of a selected candidate video material is out of a duration limitation range, present a prompt of duration limitation range not satisfied, and continue to receive a new selection operation; and in a case that a duration of a selected candidate video material is within a duration limitation range, determine the candidate video material as the video material for extracting the video segment.

In the above solution, the audio obtaining unit is further configured to:

determine the number of music points of each of at least two candidate audio materials; and determine one of the candidate audio materials of which the number of music points corresponds to the number of the video materials as the audio material to be added to the audio track of the synthesized video.

In the above solution, the video processing apparatus further includes:

a first response unit configured to, in response to a replacement operation for a video segment in the target video, replace the video segment with a selected video segment in a corresponding video material, where the replaced video segment has a same duration as the selected video segment;

a second response unit configured to, in response to an operation of adding a video material, generate a new target video based on the audio material, the newly added video material, and the video materials corresponding to the target video;

a third response unit configured to, in response to the operation of deleting a video material, delete a video material that is selected and that corresponds to the target video, and generate a new target video based on the audio material and video materials corresponding to the target video except for the deleted video material; and a fourth response unit configured to, in response to an operation of updating an order of some video materials, update the order of the video materials corresponding to the target video, and generate a new target video based on the audio material and the video materials in the updated order.

In the above solution, the video processing apparatus further includes:

an audio material cropping unit configured to, in a case that a total duration of the video materials is less than or equal to a duration of the audio material, cropping the audio material according to the total duration of the video materials, to cause the duration of the audio material to be less than the total duration of the video materials.

In the above solution, the splicing unit is further configured to:

in a case that, in the extracted video segments, the number of horizontal video segments is greater than or equal to the number of vertical video segments, add a background to each of the vertical video segments, and splice the extracted video segments to obtain the synthesized video; and in a case that, in the extracted video segments, the number of vertical video segments is greater than the number of horizontal video segments, trim frames of each of the horizontal video segments, and splice the extracted video segments to obtain the synthesized video.

In the above solution, the video obtaining unit is further configured to:

obtain at least two video materials submitted by a user; or
obtain a selected video material, and cropping the selected video material into at least two video materials.

In a third aspect, an electronic device is provided according to an embodiment of the present disclosure, which includes:

a memory, configured to store executable instructions; and a processors configured to execute the executable instructions to perform the video processing method according to the embodiments of the present disclosure.

In a fourth aspect, a storage medium is provided according to an embodiment of the present disclosure. The storage medium is configured to store executable instructions, and the executable instructions are configured to perform the video processing method according to the embodiments of the present disclosure when executed.

The embodiments of the present disclosure achieve the following beneficial effect.

According to the embodiments of the present disclosure, video segments in video materials are extracted according to music points in a video material, and are spliced to obtain a synthesized video, and the audio material is add to an audio track of the synthesized video to obtain a target video. In this way, the target video can be automatically generated based on the video materials and the audio material with reduced manual operations, thereby improving the efficiency and reducing the cost in producing the beat sync video.

BRIEF DESCRIPTION OF THE DRAWINGS

These and other features, advantages and aspects of the embodiments of the present disclosure will be more apparent in conjunction with following embodiments of the present disclosure with reference to accompanying drawings. Throughout the drawings, the same or similar reference signs indicate the same or similar elements. It should be understood that the drawings are schematic and the components and elements and are not necessarily drawn to scale.

DETAILED DESCRIPTION OF THE EMBODIMENTS

Figure 1:
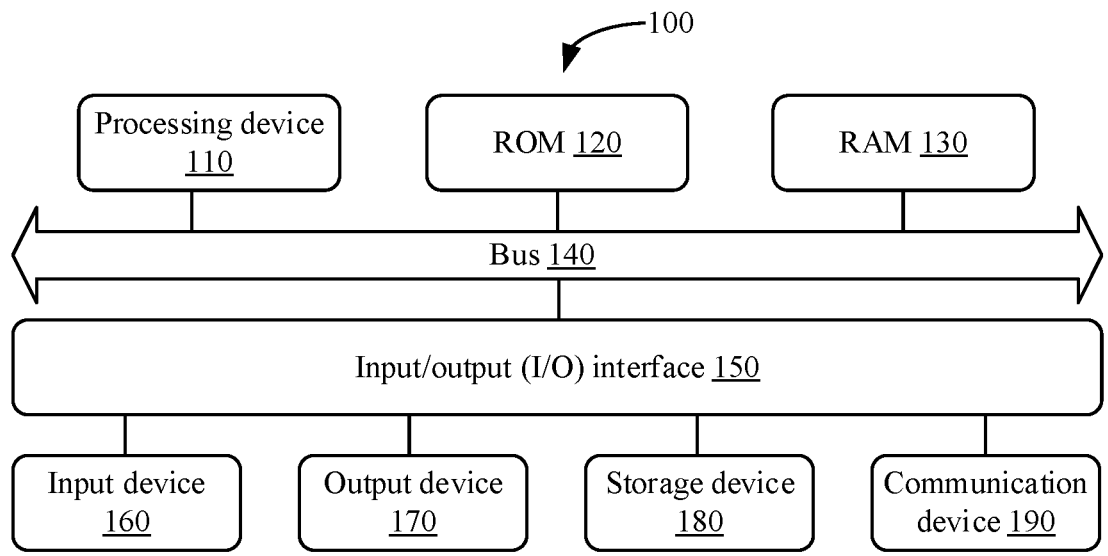
FIG. 1 is a schematic structural diagram of an electronic apparatus (for example, the electronic apparatus shown in FIG. 1, or a server) 100 according to an embodiment of the present disclosure.

Hereinafter, embodiments of the present disclosure will be described in more detail with reference to the accompanying drawings. Although some of the embodiments of the present disclosure are shown in the drawings, it should be understood that the present disclosure can be implemented in various forms and should not be construed as being limited to the embodiments set forth herein. On the contrary, these embodiments are provided for a more thorough and complete understanding of the present disclosure. It should be understood that the drawings and embodiments of the present disclosure are only used for exemplary purposes, and are not used to limit the scope of the present disclosure.

It should be understood that the various steps recorded in the method embodiments of the present disclosure may be executed in a different order, and/or executed in parallel. In addition, method embodiments may include additional steps and/or the illustrated steps may be omitted. The scope of the present disclosure is not limited in this respect.

The term "including" and its variants as used herein are open-ended includes, that is, "including but not limited to". The term "based on" indicates "based at least in part on". The term "an embodiment" indicates "at least one embodiment", the term "another embodiment" indicates "at least one additional embodiment", the term "some embodiments" indicates "at least some embodiments". Related definitions of other terms will be given in the following description. In the following description, "some embodiments" describe a subset of all possible embodiments, but it should be understood that "some embodiments" may be the same subset or different subsets of all possible embodiments, and may be combined with each other without conflict.

It is to be noted that the terms of "first" and "second" mentioned in the present disclosure are only used to distinguish between different devices, modules or units, and are not used to limit the order of functions performed by these devices, modules or units, or interdependence between the devices, modules or units.

It is to be noted that the modifiers of "a" and "a plurality of" mentioned in the present disclosure are illustrative and not restrictive, and those skilled in the art should understand that unless the context clearly indicates otherwise, it should be understood as "one or multiple".

The names of messages or information exchanged between multiple devices in the embodiments of the present disclosure are only used for illustrative purposes, and are not used to limit the scope of these messages or information.

Reference is made to FIG. 1, which shows a schematic structural diagram of an electronic apparatus 100 according to an embodiment of the present disclosure. The electronic apparatus may be various terminals, including a mobile terminal such as a mobile phone, a notebook computer, a digital broadcast receiver, a PDA (Personal Digital Assistant), a tablet computer (PAD), a PMP (Portable Multimedia Player), an in-vehicle terminal (such as an in-vehicle navigation terminal), and the like, and a fixed terminal such as a digital TV, a desktop computer and the like. The electronic apparatus shown in FIG. 1 is only an example, and should not limit the function and scope of use of the embodiments of the present disclosure.

As shown in FIG. 1, the electronic apparatus 100 includes a processing device (such as a central processing unit, a graphics processing unit) 110. The processing device 110 can perform various appropriate actions and processes based on a program stored in a Read-Only Memory (ROM) 120 or a program loaded in a Random-Access Memory (RAM) 130 from a storage device 180. The RAM 130 also stores various programs and data required by the electronic apparatus 100 for operation. The processing device 110, the ROM 120, and the RAM 130 are connected to each other via a bus 140. An Input/Output (I/O) interface 150 is also connected to the bus 140.

Generally, the following may be connected to the I/O interface 150: an input device 160 such as a touch screen, a touch pad, a keyboard, a mouse, a camera, a microphone, an accelerometer, a gyroscope, an output device 170 such as a Liquid Crystal Display (LCD), a speaker, and a vibrator, a storage device 180 such as a magnetic tape and a hard disk, and a communication device 190. Based on the communication device 190, the electronic apparatus 100 may communicate with other apparatuses through wired or wireless communication to exchange data. Although FIG. 1 shows the electronic apparatus 100 including various devices, it should be understood that not all shown devices are required to be implemented or included. The shown devices may be replaced by other devices, or more or less devices may be included.

In particular, the processes, described above with reference to flow charts, may be implemented as a computer software program according to an embodiment of the present disclosure. For example, a computer program product is provided according to an embodiment of the present disclosure, the computer program product includes a computer program embodied on a computer readable medium. The computer program includes program codes for performing the method shown in the flowchart. In such embodiments, the computer program may be downloaded and installed from the network through the communication device 190, installed from the storage device 180, or installed from the ROM 120. The computer program, when being executed by the processing device 110, performs functions defined in the method according to the embodiments of the present disclosure.

It should be noted that the computer readable medium provided according to the present disclosure, may be a computer readable signal medium or a computer readable storage medium or any combination of the two. The computer readable storage medium can be, for example, but not limited to, an electronic, magnetic, optical, electromagnetic, infrared, or semiconductor system, apparatus, or device, or any combination of the foregoing. More particularly, the computer readable storage medium may include, but not limited to, an electrical connection having one or more wires, a portable computer diskette, a hard disk, a RAM, a ROM, an Erasable Programmable Read-Only Memory (EPROM), a flash memory, an optical fiber, a portable Compact Disk Read-Only Memory (CD-ROM), an optical storage device, a magnetic storage device, or any suitable combination of the foregoing.

In the present disclosure, the computer readable storage medium can be any tangible medium containing or storing a program, where the program can be used by an instruction execution system, apparatus or device or used in combination therewith. In the present disclosure, the computer readable signal medium may include a data signal transmitted in a baseband or transmitted as a part of a carrier wave. The data signal carries computer readable program codes. The transmitted data signal may has a variety of forms including, but not limited to, an electromagnetic signal, an optical signal, or any suitable combination of the above. The computer readable signal medium may also be any other computer readable medium except for the computer readable storage medium. The computer readable signal medium can send, transmit or transfer programs used by an instruction execution system, an instruction execution apparatus and an instruction execution device or used in combination with the instruction execution system, the instruction execution apparatus and the instruction execution device. The program codes included in the computer readable medium may be transferred through any proper medium including, but not limited to, an electric wire, an optical cable, RF (Radio Frequency), and the like, and any proper combination of the above.

The computer readable medium may be included in the electronic apparatus 100. Alternatively, the computer readable medium may exist independently and not assembled in the electronic apparatus 100.

The computer readable medium may carry one or more programs. The electronic apparatus 100, when executing the one or more programs, cause the electronic apparatus to perform the video processing method according to the embodiments of the present disclosure.

The computer program codes for performing the operations according to the present disclosure may be written in at least one programming language or a combination of the at least one programming language. The programming language includes an object oriented programming language such as Java, Smalltalk, C++ and a conventional procedural programming language such as "C" programming language or a programming language similar to "C" programming language. The program codes may be completely executed on a user computer, partially executed on the user computer, executed as a standalone software package, partially executed on the user computer and partially executed on a remote computer, or completely executed on the remote computer or a server. In the cases relating to the remote computer, the remote computer may be connected to the user computer via any kind of networks including Local Area Network (LAN) or Wide Area Network (WAN), or the remote computer may be connected to an external computer (for example, via Internet provided by an Internet service provider).

The flowcharts and block diagrams in the drawings show architectures, functions and operations that may be realized with the systems, methods and computer program products according to the embodiments of the present disclosure. Each block in the flowcharts or block diagrams may represent a module, a program segment or a part of codes. The module, the program segment or the part of codes includes one or more executable instructions for implementing a specified logical function. It should be noted that in some substitution implementations, a function indicated in the block may also occur in an order different from that indicated in the drawings. For example, two steps respectively indicated in two blocks that are connected to each other in an order may be implemented in parallel. Sometimes the two steps may be implemented in a reverse order, which depends on a function related to the steps. It should also be noted that each block in the block diagrams and/or flowcharts and a combination of blocks in the block diagrams and/or flowcharts may be implemented by a special hardware-based system for performing a specified function or operation or implemented by a combination of a special hardware and a computer instruction.

Units involved in the embodiments of the present disclosure may be implemented by software or by hardware. The names of the units do not in any way constitute a limitation on the unit itself, for example, the video obtaining unit may also be named "a unit for obtaining a video material".

The functions described in the embodiments of the present disclosure may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Parts (ASSP), System on Chip (SOC), Complex Programmable Logical device (CPLD), and the like.

In the context of the present disclosure, a machine-readable medium may be a tangible medium, which may contain or store a program for use by an instruction execution system, apparatus, or device or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium may include an electrical connection based on one or more wires, a portable computer disk, a hard disk, a Random Access Memory (RAM), a Read-Only Memory (ROM), an Erasable Programmable Read-Only Memory (EPROM or flash memory), an optical fiber, a Portable Compact Disk Read-Only Memory (CD-ROM), an optical storage device, a magnetic storage device, or any suitable combination of the foregoing.

It should be understood that, the units and/or modules in the video processing apparatus according to the embodiments of the present disclosure can be implemented in the electronic apparatus shown in FIG. 1 in the form of software (such as a computer program stored in the above computer software program), or implemented in the electronic apparatus shown in FIG. 1 in the form of the hardware logic components (such as FPGA, ASIC, ASSP, SOC and CPLD). In a case that the video processing apparatus is implemented in the electronic apparatus in the form of software, it may be stored in the storage device or ROM in FIG. 1, and when it is read into the RAM by the processor for execution, the video processing method of the embodiment of the present disclosure is implemented.

Figure 2:
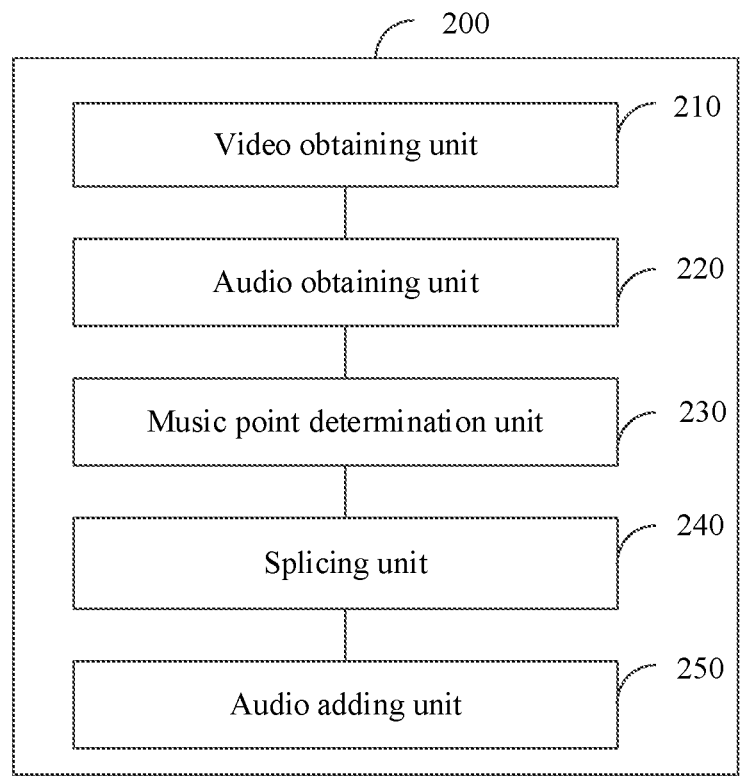
FIG. 2 is schematic structural diagram of a video processing apparatus according to an optional embodiment of the present disclosure.
Figure 3:
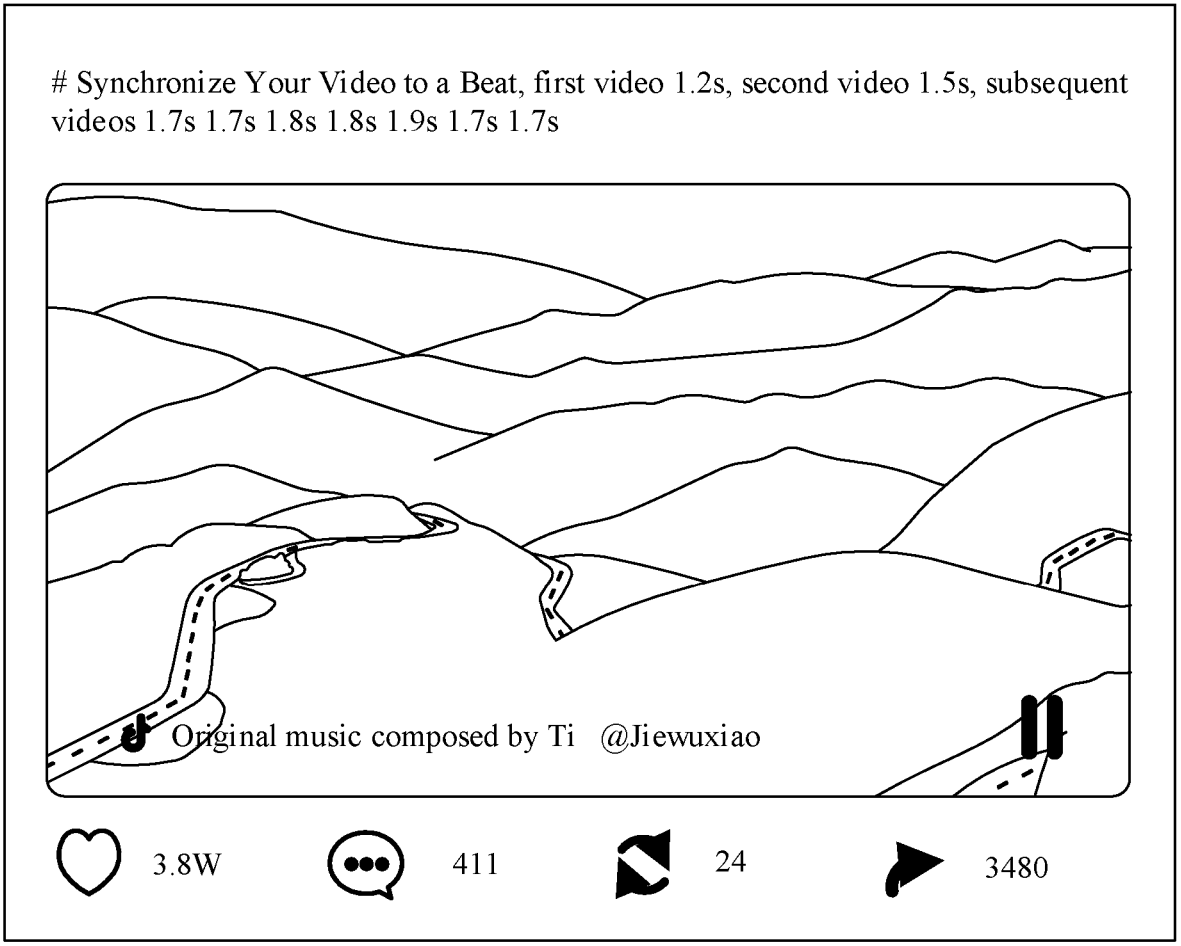
FIG. 3 is a schematic diagram of a displayed page of a tutorial for producing a beat sync video in the conventional technology.

Reference is made to FIG. 2, which is a schematic structural diagram of a video processing apparatus 200 according to an optional embodiment of the present disclosure, and shows the following units:

- a video obtaining unit 210, configured to obtain video materials;
- an audio obtaining unit 220, configured to obtain an audio material;
- a music point determination unit 230, configured to determine music points of the audio material, and extract a video segment from each of the video materials according to the music points;
- a splicing unit 240, configured to splice extracted video segments to obtain a synthesized video; and
- an audio adding unit 250, configured to add the audio material to an audio track of the synthesized video to obtain a target video.

It is to be noted that the above classification of units does not constitute a limitation on the electronic apparatus. For example, some units can be split into two or more subunits, or some units can be combined into a new unit.

It is to be further noted that the names of the units do not in any way constitute a limitation on the unit itself, for example, the above video obtaining unit 210 may also be named "a unit for obtaining a video material".

For the same reason, the units and/or modules not described in detail in the electronic apparatus do not represent the default of the corresponding unit and/or module. Any operation performed by the electronic apparatus can be performed by corresponding units and/or modules in the electronic apparatus.

Figure 4A:
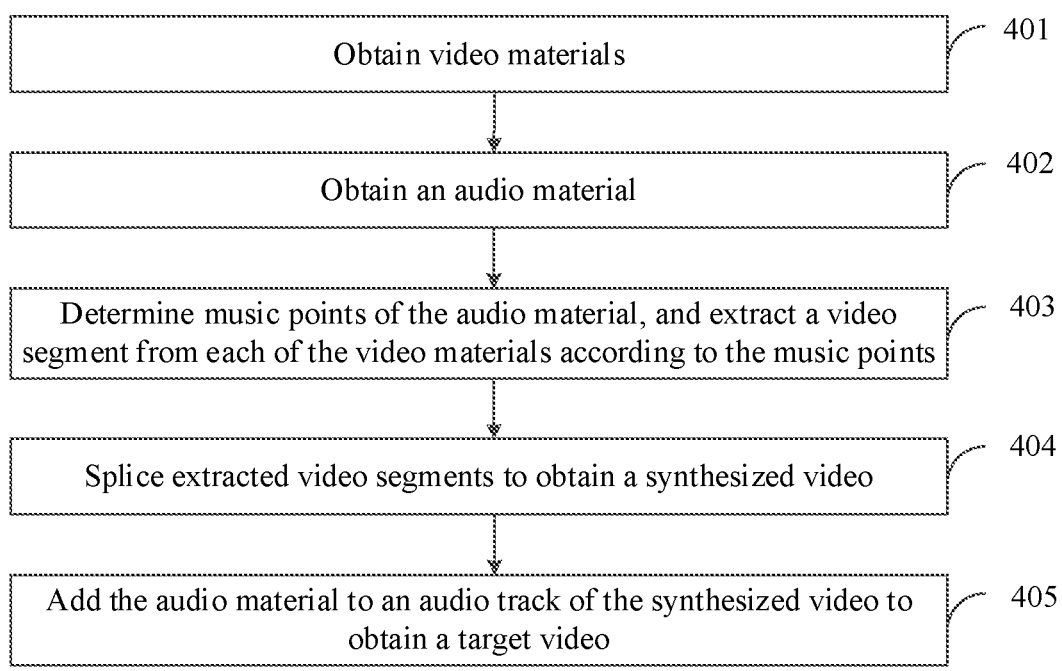
FIGS. 4A to 4C are flow charts of a video processing method according to optional embodiments of the present disclosure.

The video processing method according to the embodiments of the present disclosure may be executed by an electronic apparatus, or by a server, or jointly executed by the electronic apparatus and the server. A process of implementing a video processing method through an embedded video processing apparatus embedded in the electronic apparatus will be described in combination with exemplary applications and structures of the electronic apparatus described above. Reference is made to FIG. 4A, which is a flowchart of a video processing method according to an optional embodiment of the present disclosure. For example, when the processing device 801 loads a program in the Read Only Memory (ROM) 102 or a program in the storage device 180 into the Random Access Memory (RAM), and executes the program, the video processing method shown in FIG. 4A is implemented. The steps shown in FIG. 4A are described below.

In step 401, video materials are obtained.

Video materials uploaded by a user are obtained. The video materials may be network video materials or locally stored video materials.

In some embodiments, an upload page may be loaded on a client, and at least two candidate video materials are presented in the upload page for the user to select.

In some embodiments, the obtaining video materials may be implemented in following manners:

obtaining at least two video materials submitted by the user; or obtaining a selected video material, and cropping the selected video material into at least two video materials.

For example, two selection modes are provided to the user, including: a single material upload mode, in which when the user selects the single material upload mode, a video material selected by the user is obtained and the selected video material is cut into at least two video materials; and a multi-material upload mode, in which at least two video materials submitted by the user are directly obtained. After the above processing, at least two video materials are obtained, which improves the flexibility of obtaining video materials.

In some embodiments, the obtaining video materials may be implemented in following manners:

in response to a selection operation for the candidate video materials, in a case that a duration of a selected candidate video material is out of a duration limitation range, a prompt of duration limitation range not satisfied is presented, and a new selection operation is continued to be received; and in a case that the duration of the selected candidate video material is within the duration limitation range, the candidate video material is determined as the video material for extracting the video segment.

The duration limitation range may be set according to actual application scenarios. For example, a shortest duration in the duration limitation range is 5 seconds, and a longest duration in the duration limitation range is 60 seconds. That is, the duration limitation range is [5 seconds, 60 seconds]. When the duration of the candidate video material selected by the user is 2 seconds, the prompt of duration limitation range not satisfied is presented and a new selection operation is continued to be received. When the duration of the candidate video material selected by the user is 50 seconds, the candidate video material is determined as the video material for extracting the video segment, to ensure the validity of the obtained video material, and avoid a case that the user selects an excessive long video material and spends long time uploading the video material.

Figure 5A:
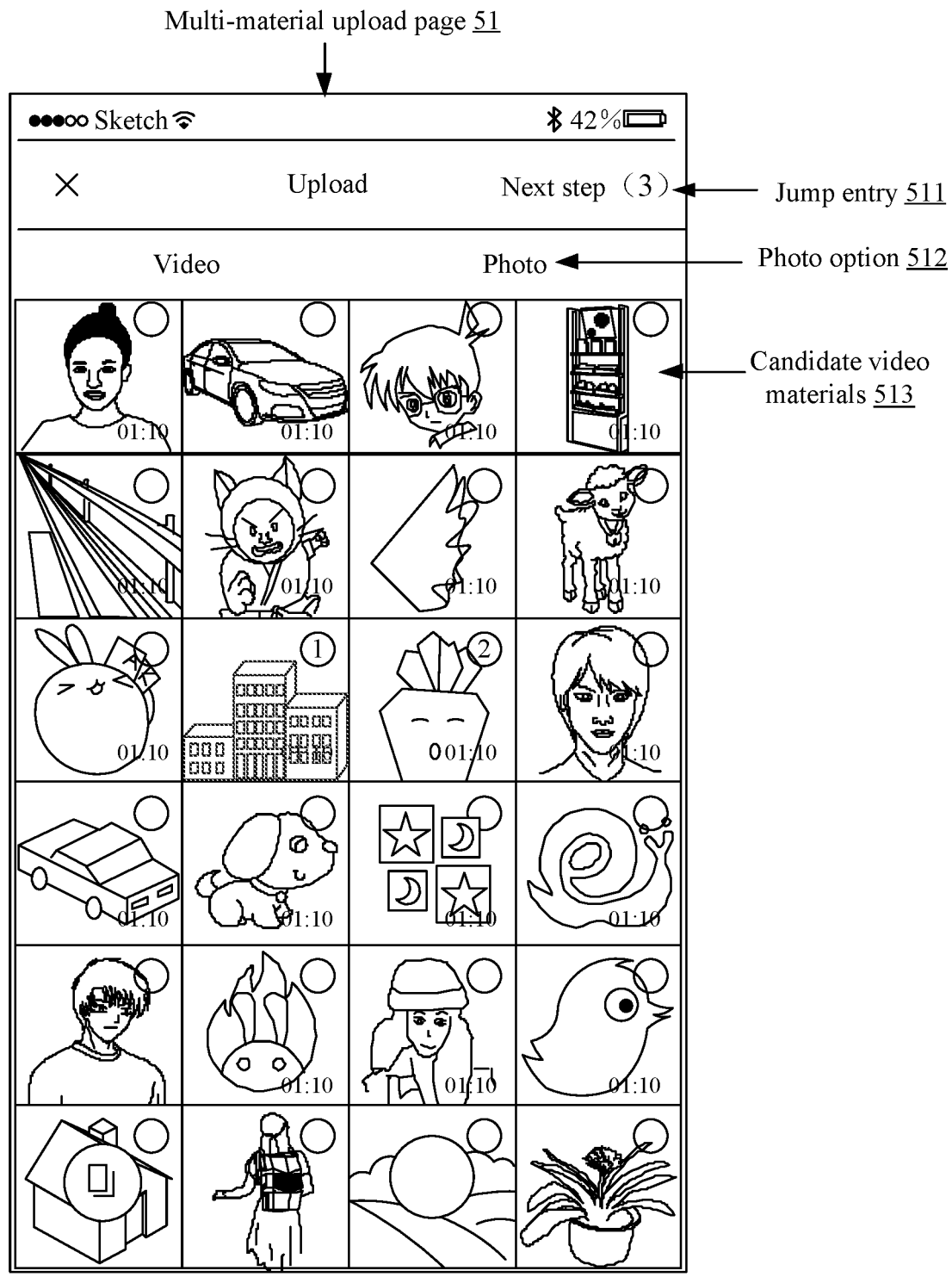
FIG. 5A is a schematic diagram of a multi-material upload page according to an embodiment of the present disclosure.

As an example, reference is made to FIG. 5A, which is a schematic diagram of a multi-material upload page 21 on a client according to an embodiment of the present disclosure. In FIG. 5A, multiple candidate video materials are presented, and a "next step" jump entry 511 is shown. The candidate video material 513 is taken as an example in FIG. 5A. The user may select the candidate video material, and triggers the jump entry 511 in FIG. 5A after the selection is completed, to load a next page on the client. In addition, FIG. 5A also presents a photo option 512, and the user may trigger this option and select a photo to generate the target video based on the photo.

Figure 5B:
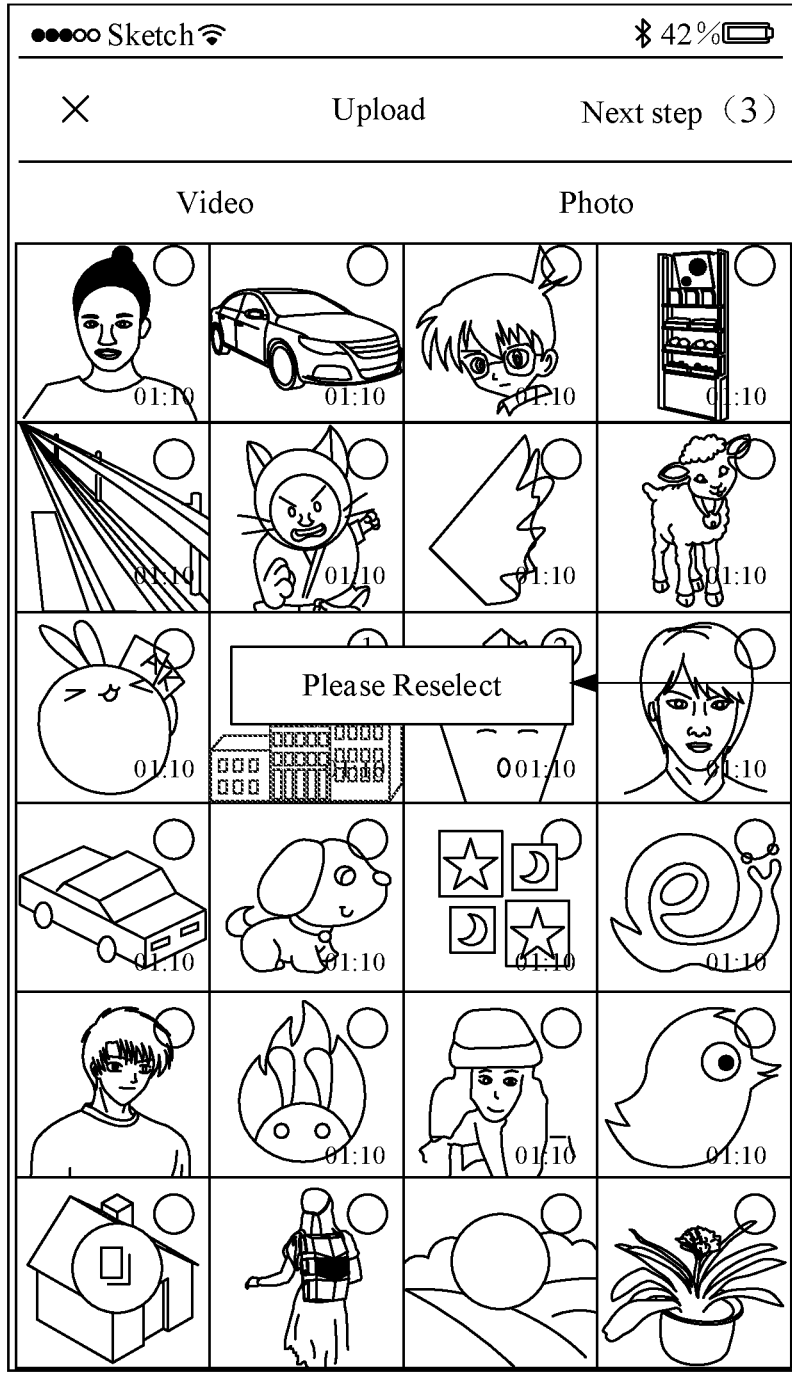
FIG. 5B is a schematic diagram of a multi-material upload page that includes a prompt according to an embodiment of the present disclosure.

As an example, referring to FIG. 5B, which is a schematic diagram of a multi-material upload page that includes a prompt according to an embodiment of the present disclosure, when a user selects a candidate video material that exceeds the duration limitation range, the prompt 514 of duration limitation range exceeded, such as "Please reselect" shown in FIG. 5B is presented, to remind the user.

In some embodiments, when the audio material is acquired, a shortest music interval of the audio material is determined, and the shortest music interval is determined as the shortest duration in the duration limitation range.

When the audio material is obtained, for example, an audio material obtained for a previous video processing is obtained as the audio material for the current video processing by default, music intervals of the audio material are determined, and the shortest music interval among the music intervals is determined as the shortest duration in the duration limitation range. For example, if the music intervals of the audio material include 5 seconds, 4 seconds, and 6 seconds, the shortest duration in the duration limitation range is determined to be 4 seconds, so as to ensure that the duration of the video material selected by the user is not less than the shortest music interval. The method of determining the music intervals will be described in detail later.

In step 402, an audio material is obtained.

The audio material is obtained. Similarly, the audio material may be a network audio material or a locally stored audio material.

In some embodiments, the obtaining an audio material may be implemented in the following manner:
at least two candidate audio materials are presented, and one of the candidate audio materials selected by the user is determined as the audio material to be added to the synthesized video.

In some embodiments, the obtaining an audio material may be implemented in the following manner:
the number of music points of each of the at least two candidate audio materials is determined; and one of the least two candidate audio materials of which the number of music points corresponds to the number of the video materials is determined as the audio material to be added to the audio track of the synthesized video.

In addition to the active selection by the user, an audio material matching the video materials may alternatively be selected according to the video materials. Specifically, the number of music points of each of at least two candidate audio materials is determined, where the method for determining the music points is described in detail later. The candidate audio material of which the number of music points corresponds to the number of the video materials is determined as the audio material to be added to the audio track of the subsequently generated synthesized video. The "corresponds" here refers to the number of music points is closest to the number of video materials minus one. For example, if the number of the music points is set to M, and the number of the video materials is set to N, the number of the music points corresponding to the number of the video materials refers to the M that is closest to N−1, where M is an integer greater than zero, and N is an integer greater than 1. For ease of understanding, if the number of music points of a candidate audio material A is 5, the number of music points of a candidate audio material B is 6, and the number of video materials is 6, the candidate audio material A is determined the audio material to be added to the audio track of the synthesized video. With the above method, the matching degree between audio material and video materials is improved.

Figure 5C:
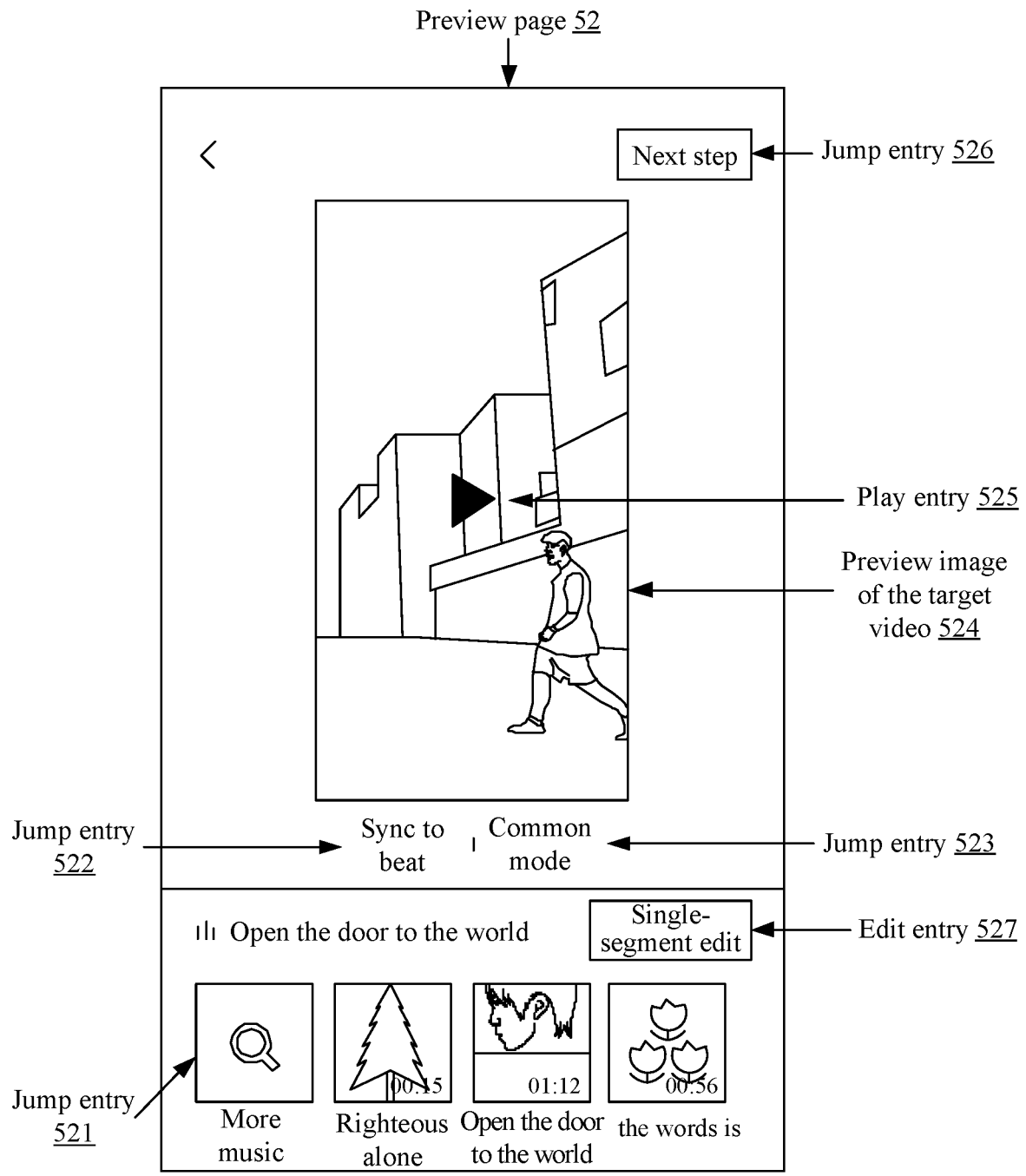
FIG. 5C is a schematic diagram of a preview page according to an embodiment of the present disclosure.

As an example, reference is made to FIG. 5C, which is schematic diagram of a preview page 52 on a client according to an embodiment of the present disclosure. The preview page may be loaded after the user triggers the jump entry 511 in FIG. 5A. As shown in FIG. 5C, the preview images of at least two candidate audio materials are presented, the user may select from the candidate audio materials by clicking the preview images. In FIG. 5C, a jump entry 521 of "More Music" is further presented. When the user triggers the jump entry 521, a music selection page including at least two candidate audio materials is loaded, which is more convenient for the user to select. In addition, in FIG. 5C, a jump entry 522 of "Sync to beat" and a jump entry 523 of "Normal Mode" are further presented. "Sync to beat" corresponds to the video processing method according to the embodiments of the present disclosure. The preview page 52 is in the "Sync to beat" mode by default, and the "Normal Mode" corresponds to the conventional method for producing the beat sync video in related technologies. When the user triggers the "Normal Mode" jump entry 523, a page for producing a beat sync video in the conventional manner is loaded, and the user may manually clip the video in the page by counting seconds to obtain the target video, which improves the flexibility of the user in selecting the producing mode.

In some embodiments, after acquiring the audio material, the method further includes:
in a case that a total duration of the video materials is less than or equal to a duration of the audio material, cropping the audio material according to the total duration of the video materials, to cause the duration of the audio material to be less than the total duration of the video materials.

For example, if the total duration of all the acquired video materials is 50 seconds, and the duration of the audio materials is 60 seconds, the audio material is cropped according to the total duration of the video materials. For example, 80% of the total duration of the video materials, that is, 40 seconds is determined as the duration of the cropped audio material, and the audio material is cropped to 40 seconds. Of course, the duration of the cropped audio material is not limited to 80% of the total duration of the video materials, and may be set according to actual application scenarios. When cropping the audio material, the head or tail of the audio material may be cut directly, or the climax part of the audio material may be extracted until the length of the extracted climax part reaches the duration of the cropped audio material, which is not limited in the embodiment of the present disclosure. Through the above operation, the probability that the duration of the subsequently extracted video segments does not match the duration of the audio material is reduced.

In step 403, music points of the audio material are determined, and a video segment is extracted from each of the video materials according to the music points.

The music points of the audio material are determined, and a video segment is extracted from each of the video materials according to the determined music points, so that transition timings of extracted video segments match time stamps of the music points of the audio material. The music point refers to a point in the audio material that meets a set beat change condition, and the method for determining the music points will be described later.

In step 404, extracted video segments are spliced to obtain a synthesized video.

The extracted video segments are spliced according to the order of the video materials to obtain a synthesized video. In a case that one selected video material is cropped to at least two video materials, the order between the at least two cropped video materials is consistent with the time order of the two video materials in the selected video material. For example, in the selected video material, a video material A is first played, a video material B is then played, the order between the two video materials is the video material A→the video material B. If at least two video materials that are uploaded by the user in the multi-material upload mode are obtained, the order between at least two video materials is consistent with an order in which the user selects the video materials for uploading. For example, the user first selects a video material A, then selects a video material B, and then uploads the video materials A and B. The order between the two video materials is the video material A→the video material B.

In some embodiments, the above splicing extracted video segments to obtain a synthesized video may be implemented in the following manner:

in a case that, in the extracted video segments, the number of horizontal video segments is greater than or equal to the number of vertical video segments, a background is added to each of the vertical video segments, and the extracted video segments are spliced to obtain the synthesized video; and in a case that, in the extracted video segments, the number of vertical video segments is greater than the number of horizontal video segments, frames of each of the horizontal video segments are trimmed, and the extracted video segments are spliced to obtain the synthesized video.

In order to improve a viewing experience of the synthesized video, in the embodiments of the present disclosure, aspect ratios of the extracted video segments are unified. Specifically, in a case that the number of the horizontal video segments is greater than or equal to the number of the vertical video segments, a blurred background is added to each of the vertical video segments, so that the aspect ratio of the vertical video segments having the background is consistent with that of the horizontal video segments, and all of the video segments are spliced together to obtain the synthesized video; in a case that the number of the vertical video segments is greater than the number of the horizontal video segments, the frames of each of the horizontal video segments is cropped so that the aspect ratio of the cropped horizontal video segments is the same as that of the vertical video segment, and all video segments are spliced together to obtain the synthesized video. When the frames are cropped, the key content in the horizontal video segments may be retained, and uncritical content may be cut off.

In step 405, the audio material is added to the audio track of the synthesized video to obtain the target video.

The audio material is added to the audio track of the synthesized video to obtain the target video. Specifically, a new audio track may be added to the synthesized video, and the audio material may be added to the new audio track; or sound in an existing audio track of the synthesized video may be replaced with the audio material, which may be set based on actual applications.

In some embodiments, a preview image of the target video and a play entry of the target video are presented, and the target video is played in response to a trigger operation on the play entry.

As an example, reference is made to FIG. 5C, a preview image 524 of the target video and a play entry 525 are presented on the preview page 52. The user may trigger the play entry 525 to play the target video. A "Next Step" jump entry 526 is further presented in the preview page 52. After the user triggers the jump entry 526, a page for performing subsequent operations on the target video, such as a publishing page, is loaded.

Figure 4B:
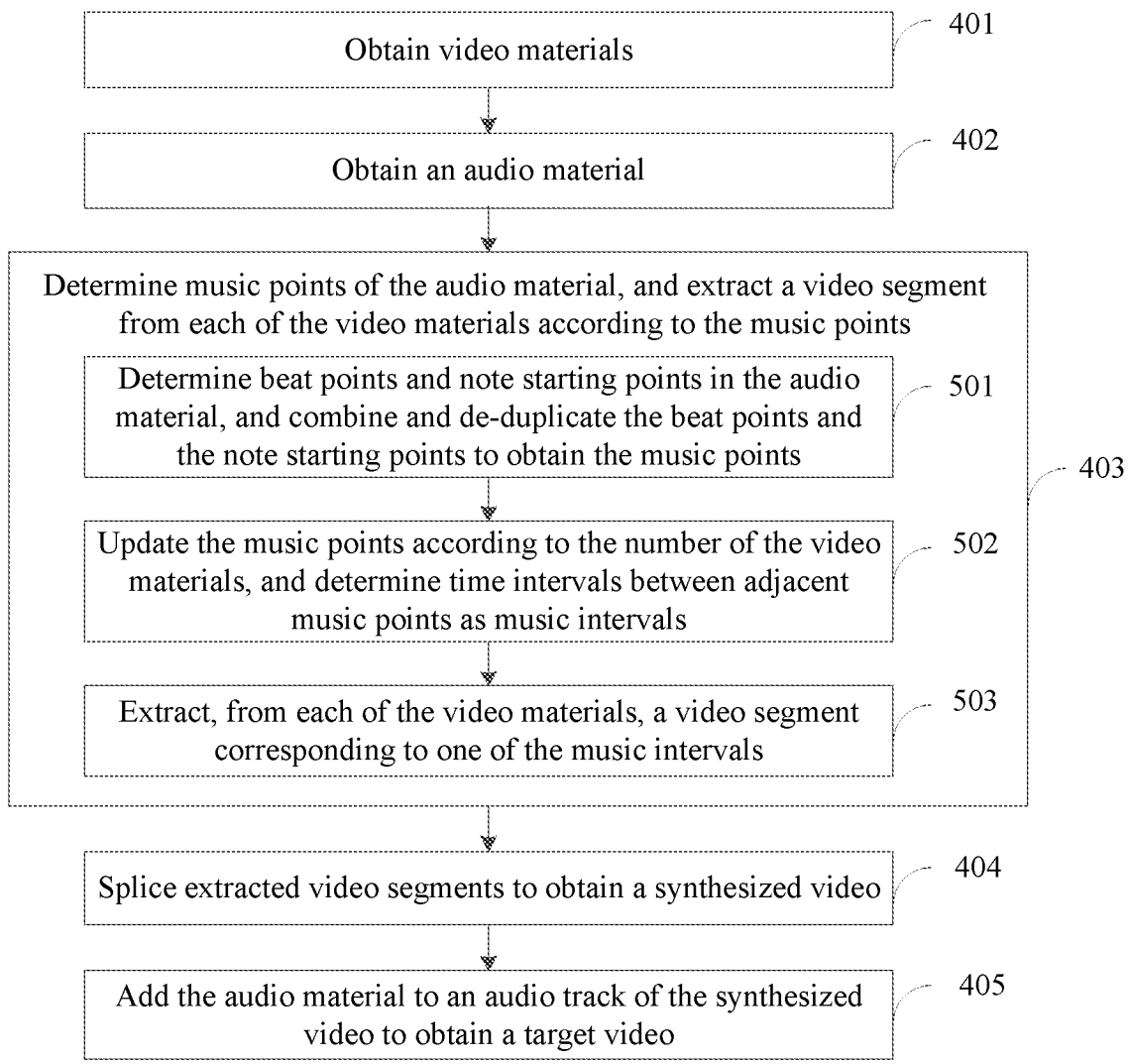

Reference is still made to FIG. 4B, which is a flowchart of a video processing method of an optional embodiment of the present disclosure. Based on FIG. 4A, step 403 may include the following steps 501 to 503.

In step 501, beat points and note starting points in the audio material are determined, and the beat points and the note starting points are combined and de-duplicated to obtain the music points.

In an embodiment of the present disclosure, the audio material is analyzed to determine the beat points and the note starting points in the audio material. Specifically, a beat analysis algorithm based on deep learning is used to analyze the audio material to obtain the beat points in the audio material and the timestamps where the beat points are located, and a short-time spectrum analysis is performed on the audio material to obtain the note starting points in the audio material and the time stamps where the note starting points are located, where the note starting points are the onset detection points. Then, the beat points and the note starting points obtained by the two methods are collected, and the beat points and the note starting points are combined and de-duplicated. In order to facilitate description, the points obtained after the combination and de-duplication are referred to as the music points. For example, the beat points include C0, C1, and C2, which are respectively at time stamps T0, T1, and T2. The note starting points include D0, D1, and D2, which are respectively at time stamps T1, T2, and T3. The beat points and the note starting points are combined to obtain {C0, C1, C2, D0, D1, D2}. The points with the same time stamp are de-duplicated, and only one of them is retained. The obtained music points are {C0, C1, C2, D2}.

In some embodiments, before the combining and de-duplicating the beat points and the note starting points, the method further includes:

determining a sound intensity of each of the beat points, and filtering out a beat point having a sound intensity lower than a sound intensity threshold.

In addition to obtaining the beat points included in the audio material and the corresponding time stamps, the sound intensity of each of the beat points may further be obtained through a beat analysis algorithm. Before the combination and de-duplication, the beat point having the sound intensity lower than the sound intensity threshold is eliminated, so as to highlight the retained beat points.

In step 502, the music points are updated according to the number of the video materials, and time intervals between adjacent music points are determined as music intervals.

The music points are updated according to the number of the video materials, so as to ensure that the number of music points equals to the number of video materials minus one, and the time intervals between adjacent music points are determined as the music intervals, which determine durations of corresponding video segments.

In some embodiments, the updating the music points according to the number of the video materials may be implemented in the following manner:

in a case that the number of the music points is consistent with the number of the video material, the music points are kept unchanged; in a case that the number of the music points is less than the number of the video materials, a new music point is added to the music points; and in a case that the number of the music points is greater than the number of the video materials, the music points are pruned.

Taking the above setting of the number of the music points being M and the number of the video materials being N as an example, when M=N−1, the music intervals each corresponds to one video material, so the music points are kept unchanged; When M<N−1, a new music point is added to the music points, for example, a new music point is added between two adjacent music points, until M=N−1; when M>N−1, the music points are pruned, that is, some of the music points are deleted until M=N−1. Through the above method, the matching degree between the number of the music points and the number of the video materials is improved.

In step 503, a video segment corresponding to one of the music intervals is extracted from each of the video materials.

According to an order, a video segment in a first video material is extracted according to a first music interval in the audio material, and a video segment in a second video material is extracted according to a second music interval in the audio material, and so on in a similar manner.

Referring to FIG. 4B, step 503 may include the following steps 601 to 604.

In step 601, at least one candidate video segment is extracted from each of the video materials according to the music intervals.

For each music interval in the audio material, at least one candidate video segment is extracted from a video material corresponding to the music interval according to the music interval. It is to be noted that when the music interval is greater than or equal to the duration of the corresponding video material, the video material is directly used as one candidate video segment; when the music interval is less than the duration of the corresponding video material, the video material is divided according to the music interval into at least two candidate video segments, from which at least one candidate video segment is extracted.

In some embodiments, the extracting at least one candidate video segment from each of the video materials according to the music intervals may be implemented in the following manner:

for each of the video materials, candidate video segments having durations meeting one of the music intervals are traversed; scores of the candidate video segments in the video material are determined; and at least one candidate video segment that meets a set score condition is extracted from the video material.

During the traversal operation, each of the video materials is divided according to the music interval to obtain the candidate video segments in a time order, until all the candidate video segments that may appear in the video material are traversed, where each obtained candidate video segment includes multiple consecutive frames. The candidate video segments in each of the video materials are scored. When scoring is performed, each frame in each of the candidate video segments is scored, and an average of scores of all frames is used as the score of the candidate video segment. It is to be noted that before obtaining the candidate video segments by dividing the video material, frames of the video material may be extracted. On this basis, each of the frames extracted from the video material may alternately be scored, and after the candidate video segments are obtained by dividing the video material, the score of the candidate video segment is determined according to scores of frames included in the candidate video segment. The scoring method is not limited in the embodiments of the present disclosure. For example, the scoring may be performed according to motion information (such as jitter, and the like.), aesthetics (such as composition) and attributes (such as a light color) in the frame. It is to be noted that when extracting frames, the video needs to be decoded. For the Android systems, one way of hard decoding and one way of soft decoding may be used for decoding, where "one way" refers to one thread. For the IOS systems, multi-threaded hard decoding may be performed. The soft decoding refers to decoding the video by using the Central Processing Unit (CPU), and the hard decoding refers to decoding the video by using a dedicated device without relying on the CPU. In addition, the strategy of extracting the frames is not limited in the embodiments of the present disclosure. For example, the strategy of extracting the frames may be 1 second/2 consecutive frames. The candidate video segments are extracted according to the music interval from the video material corresponding to the music interval in a time order, until all the candidate video segments that may appear in the video material are extracted.

After the score of each candidate video segment is determined, at least one candidate video segment that meets the set score condition is extracted from each of the video materials.

The score condition may be ranking the scores from high to low and obtaining the top K scores, where K is an integer greater than zero. Alternatively, the score condition may be ranking the scores from high to low and obtaining the scores ranking before a set proportion. Through the above method, the extracted candidate video segments are all "highlight segments", which avoids resource waste caused by extracting candidate video segments with low scores.

In step 602, one of the at least one candidate video segment extracted from each of the video materials is selected, and selected candidate video segments are spliced to obtain a combined segment, until candidate video segments extracted from the video materials are traversed to obtain all possible combined segments.

From the at least one candidate video segment extracted from each of the video materials, a candidate video segment is selected, and selected candidate video segments are spliced according to the order of the video materials to obtain a combined segment until all the candidate video segments extracted from the video materials are traversed, to obtained all possible combined segments.

In some embodiments, before the selecting one of the at least one candidate video segment extracted from each of the video materials, and stitching selected candidate video segments to obtain a combined segment, the method further includes:

in a case that the candidate video segment does not match one of the music intervals corresponding to the candidate video segment, a frame rate of the candidate video segment is adjusted, to cause a duration of the candidate video segment having the adjusted frame rate to be consistent with the music interval.

For example, if the music interval is 4 seconds, and the corresponding audio material is 2 seconds, the audio material is directly used as the candidate video segment. Because the duration of the video material does not match the music internal, in the embodiment of the present disclosure, the frame rate of the extracted candidate video segment is multiplied by 0.5, so that the duration of the candidate video segment reaches 4 seconds. With the above method, a gap in the video can be avoided.

In step 603, a score of each of the combined segments is determined.

Similarly, when determining the score of each of the combined segment, the score of the combined segment may be determined according to the scores of the candidate video segments included in the combined segment.

In some embodiments, a first weight is set for the scores of the candidate video segments included in the combined segment, joint parts between adjacent candidate video segments in the combined segment are scored, a second weight is set for scores of the joint parts, and the score of the combined segment is determined according to the first weight, the scores of the candidate video segments, the second weight and the scores of the joint parts.

In the embodiment of the present disclosure, the score of the combined segment may be obtained in combination with the scores of the joint parts in the combined segment. Specifically, a continues shooting scoring rule may be determined according to the visual principle and the continues shooting principle, and the joint parts between adjacent candidate video segments in the combined segment are scored according to the continues shooting scoring rule.

Since the candidate video segment and the joint part may have different importance, a first weight may be set for the scores of the candidate video segments and a second weight may be set for the scores of the joint parts. A higher importance causes a higher weight, which may be set according to the actual application scenarios. The scores of the candidate video segments and the scores of the joint parts are calculated according to the first weight and the second weight, to obtain the final score of the combined segment.

In addition, when the candidate video segments are spliced to obtain the combined segment, the candidate video segments may be spliced according to a continuous strategy, to make the transition between adjacent candidate video segments more smooth, and the combined segment obtained after applying the continuous strategy is scored. The continuous strategy is not limited in the embodiment of the present disclosure.

Figure 6:
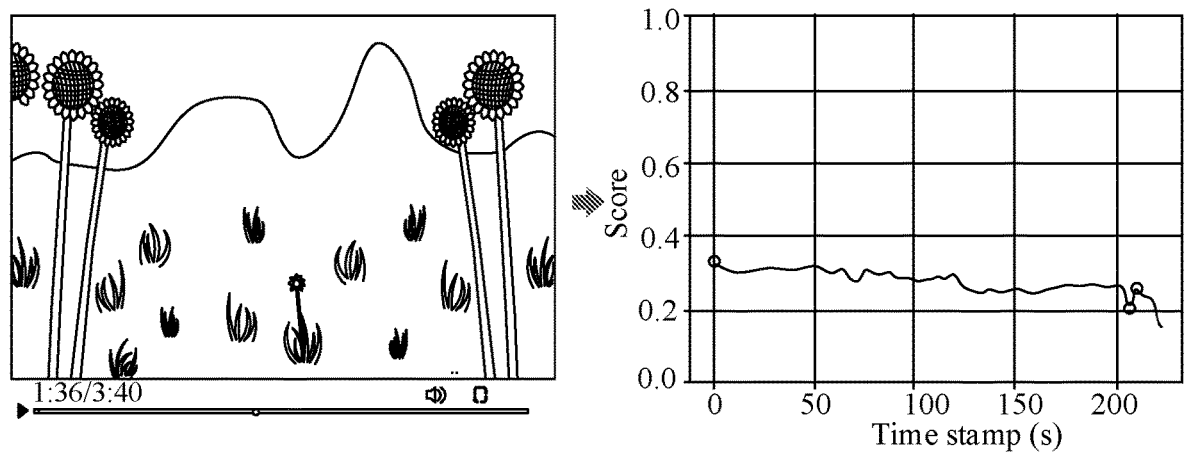
FIG. 6 is a schematic diagram of scoring according to an embodiment of the present disclosure.

As an example, refer to FIG. 6, which is a schematic diagram of scoring according to an embodiment of the present disclosure. In FIG. 6, the frames extracted from the video on the left are scored to obtain the coordinate map on the right. The horizontal axis of the coordinate map represents the time stamps of the extracted frames in the video on the left, the vertical axis of the coordinate map represents the scores of the frames. Based on this scoring method, the scores of candidate video segments and the combined segment may be determined.

In step 604, one of the combined segments with a highest score is determined, and candidate video segments in the combined segment are determined as video segments to be spliced to obtain the synthesized video.

The combined segment with the highest score is determined, and the candidate video segments in the combined segment are determined as the video segments to be spliced to obtain the synthesized video. Of course, the combined segment with the highest score may alternatively be directly determined as the synthesized video.

Figure 4C:
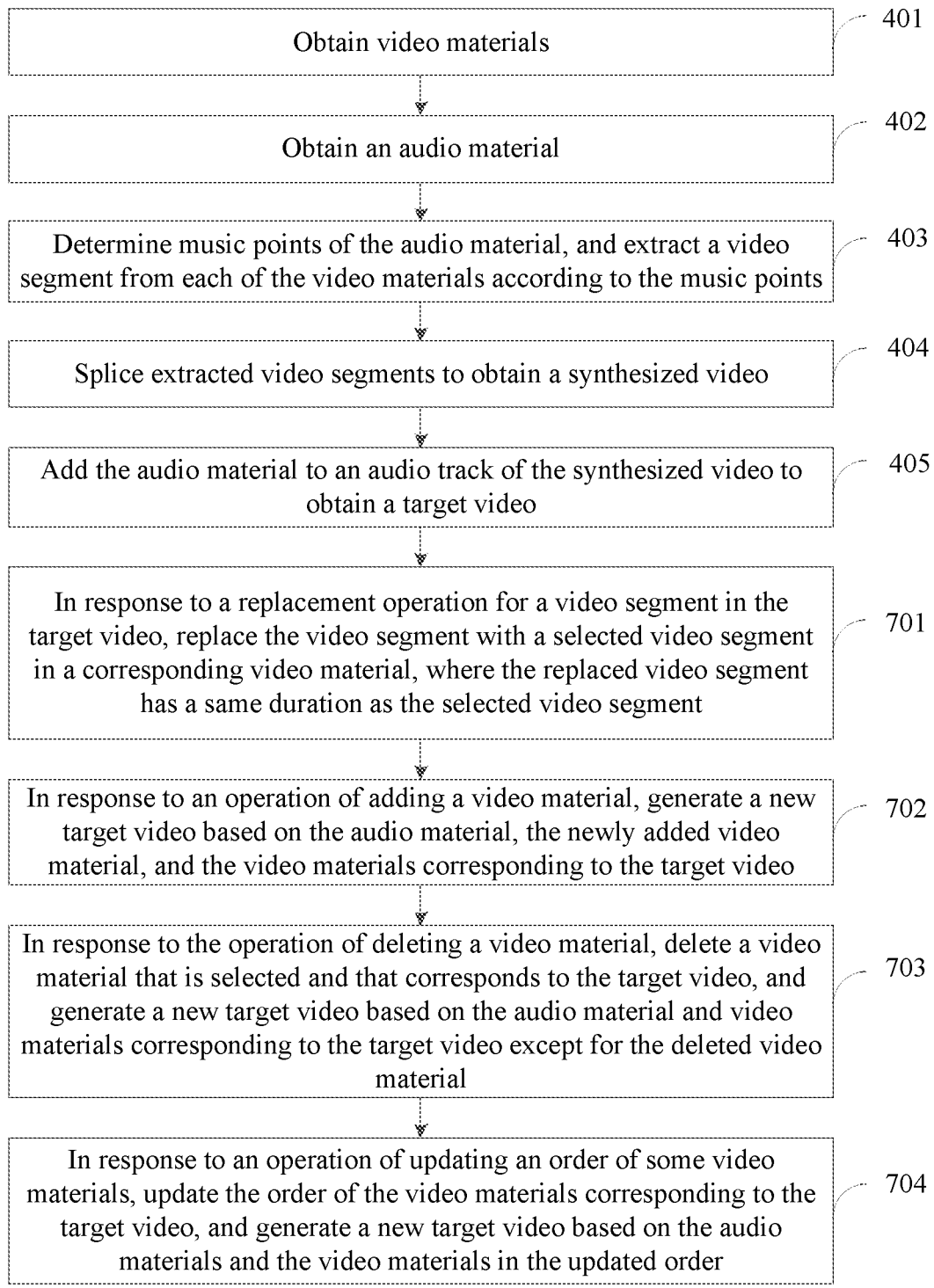

Reference is still made to FIG. 4C, which is a flow chart of a video processing method according to an optional embodiment of the present disclosure. Based on FIG. 4A, after step 405, the video processing method may further include the following steps 701 to 704.

In step 701, in response to a replacement operation for a video segment in the target video, the video segment is replaced with a selected video segment in a corresponding video material, where the replaced video segment has the same duration as the selected video segment.

For example, the target video includes a video segment $E_1$, and the video segment E1 is extracted from a video material E, when a replacement operation to replace E1 with a video segment $E_2$ in the video material E is received, the replacement is performed, where $E_1$ has the same duration as $E_2$, and $E_2$ may be selected according to user operations.

In step 702, in response to an operation of adding a video material, a new target video is generated based on the audio material, the newly added video material, and the video materials corresponding to the target video.

For example, the target video corresponds to video materials E, F, and G. When an operation to add a video material H is received, a new target video is generated based on the audio material and video materials E, F, G, and H.

In step 703, in response to the operation of deleting a video material, a video material that is selected and that corresponds to the target video is deleted, and a new target video is generated based on the audio material and video materials corresponding to the target video except for the deleted video material.

For example, the target video corresponds to the video materials E, F, and G. When an operation to delete the video material G is received, the video material G is deleted, and a new target video is regenerated based on the audio material and video materials E and F.

In step 704, in response to an operation of updating an order of some video materials, the order of the video materials corresponding to the target video is updated, and a new target video is generated based on the audio material and the video materials in the updated order.

For example, the target video corresponds to the video materials E, F, and G. When an order update operation of moving the video material E to the location of the video material F is received, the order is updated, and a new target video is generated according to the audio material and the video materials F, E, and G in the order as listed.

Figure 5D:
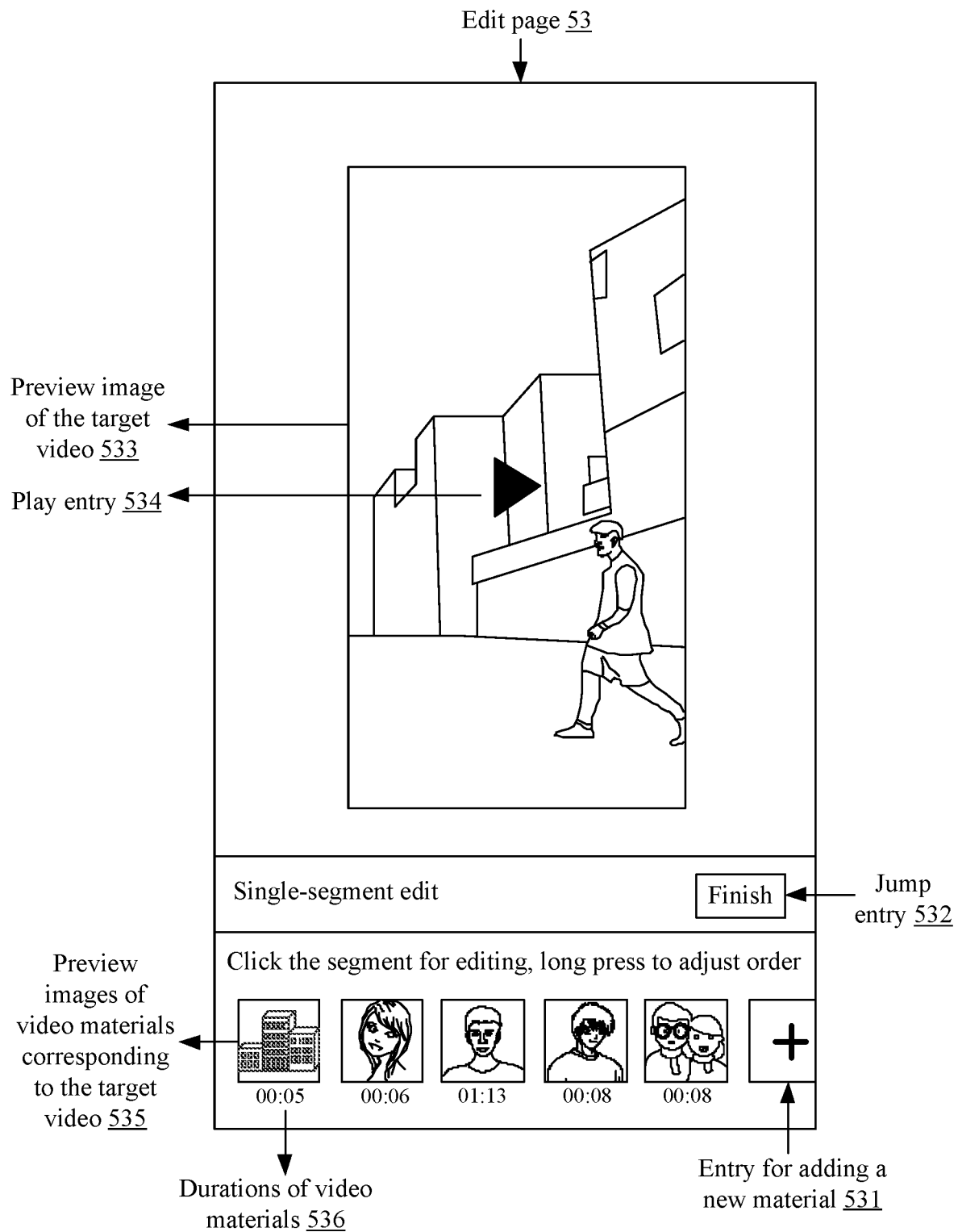
FIG. 5D is a schematic diagram of an edit page according to an embodiment of the present disclosure.

As an example, reference is made to FIG. 5D, which is a schematic diagram of an edit page 53 on the client according to an embodiment of the present disclosure. The edit page may be loaded after the user triggers an edit entry 527 in FIG. 5C. In the edit page 53, the preview image 533 of the target video and a play entry 534 are also presented, and the preview images of video materials corresponding to the target video and durations of respective video materials are also presented. In FIG. 5C, the preview images 535 of the video materials corresponding to the target video and the durations 536 of respective video materials are taken as examples. The user clicks the preview image of one of the video materials in the edit page 53 to perform the replacement operation of the video segment in the loaded replacement page. The user may trigger the entry 531 for adding a new material presented on the edit page 53, to select a new video material from the loaded upload page. The user may long press the preview image of one of the video materials in the edit page 53, and drag the video material to a delete entry presented on the edit page 53 (not shown in FIG. 5D), so that the video material is deleted. The user may long press the preview image of one of the video materials in the editing page 53 and drag the video material to the location of another video material to update the order. After editing is finished, the user may trigger the jump entry 532 to return to the preview page 52 to preview the new target video.

Figure 7:
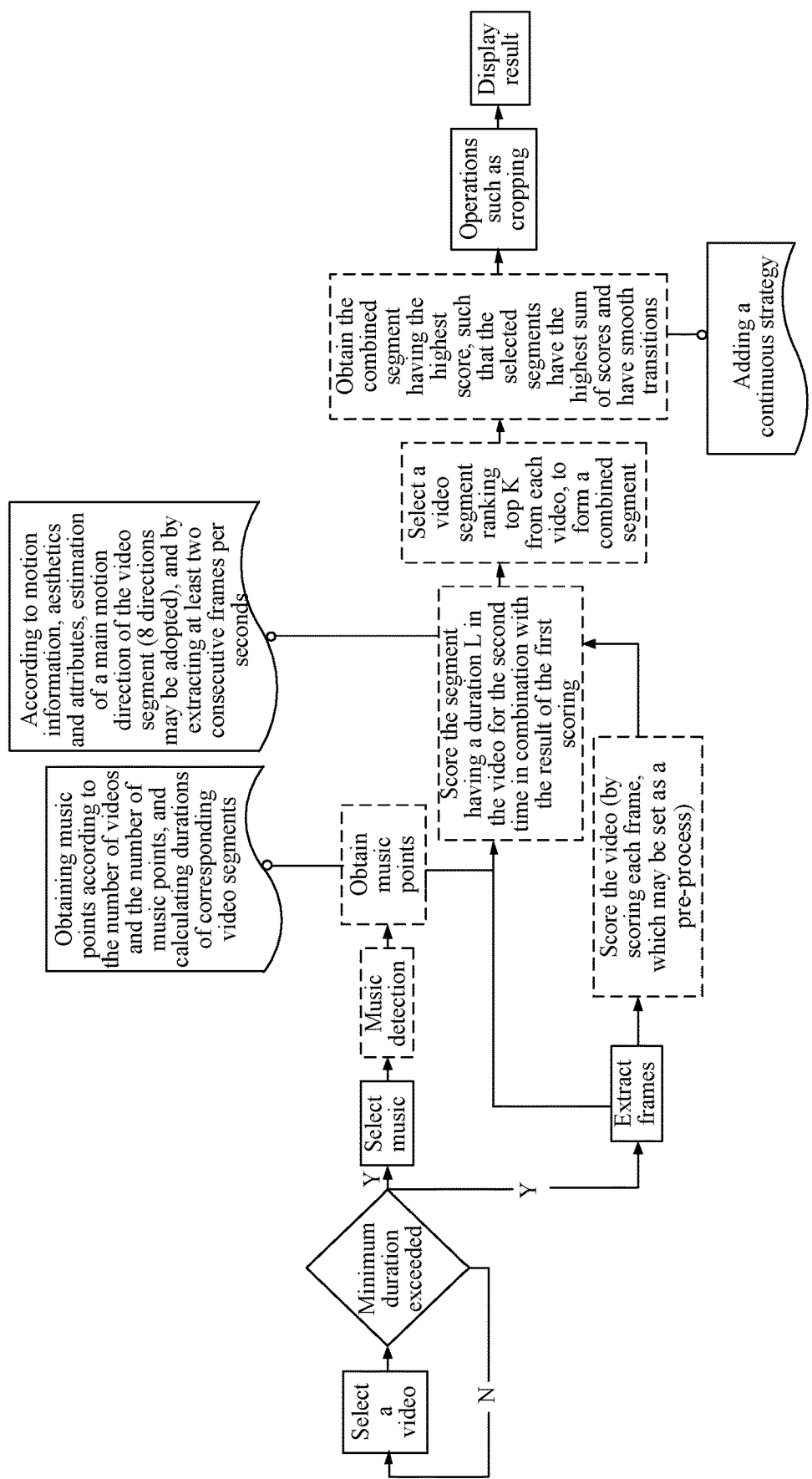
FIG. 7 is a flow chart of a video processing method according to another optional embodiment of the present disclosure.

Reference is still made to FIG. 7, which is a flow chart of a video processing method according to another optional embodiment of the present disclosure. In FIG. 7, the video is selected first, and the video corresponds to the video material above. When the selected video does not exceed the shortest duration, the video is reselected. When the selected video exceeds the minimum duration, the music is selected, where the music corresponds to the audio material above, and the selected music is detected to obtain the music points. The music points are obtained according to the number of videos and the number of music points, and durations of video segments corresponding to the obtained music points are calculated according to the music points. Here, it is assumed that the calculated length of the video segment is L. At the same time, frames are extracted from the video, each of the frames extracted from the video is scored, where the operation of scoring each frame may be set as a pre-process. Integrating the results of scoring each frame for the first time, the segment having the duration of L in the video is scored for the second time. Specifically, scoring is performed in combination with multiple dimensions of motion, aesthetics, and attributes, and based on estimation of the main motion directions in the frames in the video segment, where 8 directions may be applied here, which includes east, south, west, north, southeast, southwest, northeast, and northwest. It is to be noted that the frame extracting strategy applied in the above frame extracting may be extracting at least two consecutive frames per second. After scoring is completed, video segments of each of the videos having scores that rank top K are obtained to form combined segments, and the combined segment are scored, where K is an integer greater than zero. When the combined segments are scored, the scores of the video segments included in the combined segment and the scores of the joint parts between adjacent video segments are combined to obtain the score of the combined segment. Then, the combined segment with the highest final score is obtained, in which the sum of the scores of the video segments is the highest and the transitions between adjacent video segments are smooth. It is to be noted that when splicing the video segments into the combined segment, the adjacent video segments may be processed according to a continuous strategy, to make the transitions between adjacent video segments more smooth. Finally, operations such as cropping, adding music to the audio track, and tone adjustment are performed to obtain the target video, and the target video is displayed. From the above exemplary implementation shown in FIG. 7 according to the embodiment of the present disclosure, it can be seen that after the video and music are obtained, the target video with the best effect is obtained according to the solution of obtaining music points and extracting and scoring frames, thereby improving the efficiency and reducing the cost of producing the beat sync video.

Figure 8:
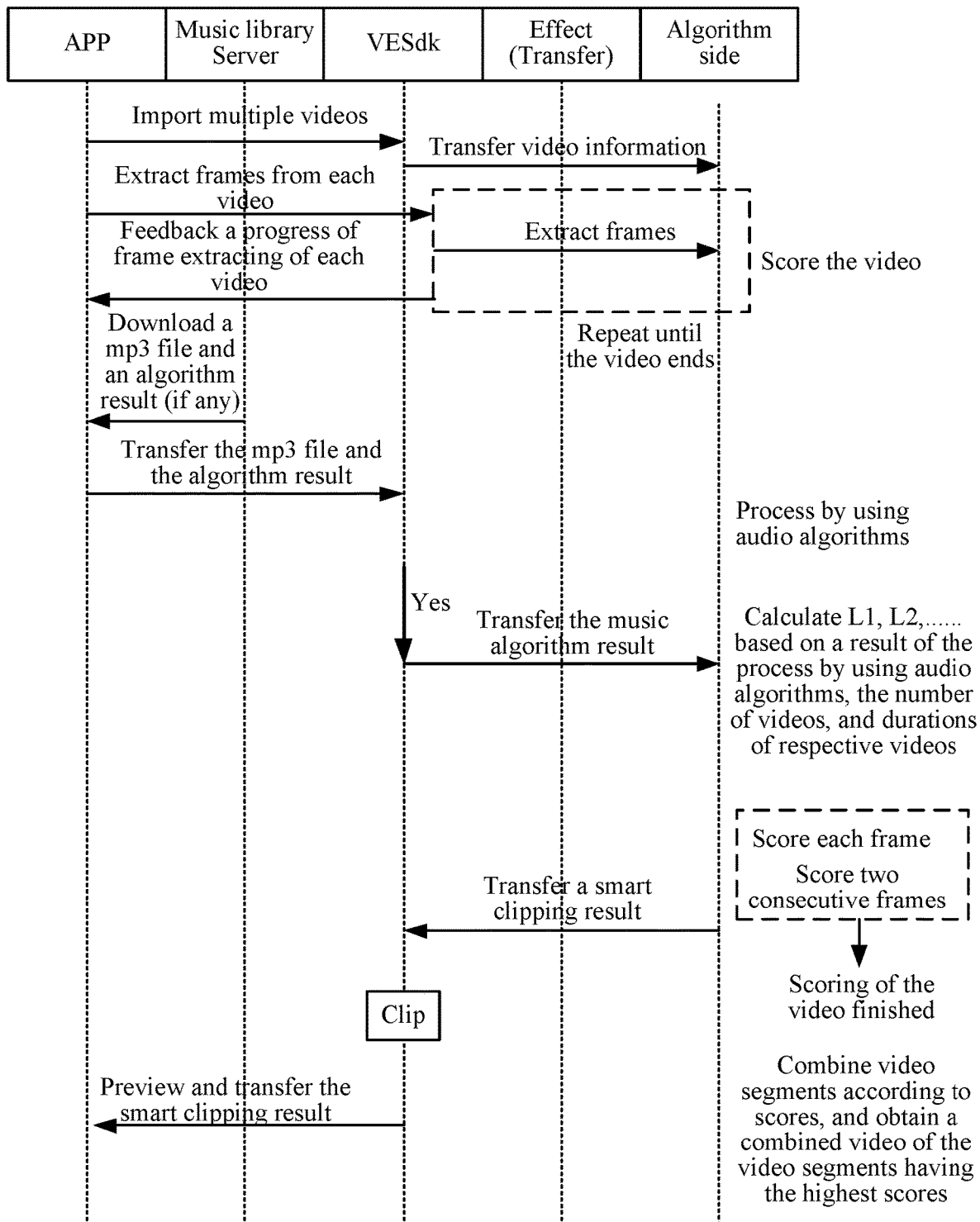
FIG. 8 is a flow chart of a video processing method according to another optional embodiment of the present disclosure.

Reference is made to FIG. 8, which is a flow chart of a video processing method according to another optional embodiment of the present disclosure. For ease of understanding, FIG. 8 is described in the form of numbered steps in the following.

In ①, multiple videos are imported through an application (APP) to a Visual Editor Software Development Kit (VEsdk). The videos are the video materials above, and VEsdk transparently transfer the video information to the algorithm side. VEsdk is used for scheduling algorithms (video algorithms and audio algorithms) and interacting with applications. Of course, this does not constitute a limitation to the embodiments of the present disclosure, that is, other software development kits can also be used for algorithm scheduling and application interaction in other development environments.

In ②, for each video, the application sends an instruction to VESdk to start the frame extraction of a single video, and VESdk feeds back the progress of the frame extraction of the single video to the application. Further, after extracting the frames, VESdk transmits the extracted frames to the algorithm side for scoring the video, and repeats operations of extracting frames and scoring until the video ends, where the scoring the video refers to scoring the frames.

In ③, the application downloads a mp3 file and an algorithm result from a music library server. The algorithm result here refers to the music points included in the mp3 file.

In ④, the application transfers the mp3 file and algorithm result to VESdk, and VESdk transfers the algorithm result to the algorithm side, so that the algorithm side determines multiple music intervals, including L1, L2, by integrating the algorithm result, the number of the videos, and durations of respective videos.

In ⑤, the algorithm side scores each of the frames and every two consecutive frames of the video. After the scoring of each frame is finished, a segment is selected from each video according to the scoring of the frames to form at least two combined videos, and one of the at least two combined segment with the highest score is selected, which includes segments each having the highest score. The algorithm side delivers the smart clipping result to VESdk according to the combined segment.

In ⑥, VESdk clips multiple video segments to obtain a synthesized video, and imports the mp3 file into an audio track of the synthesized video to obtain a target video. The target video is the updated smart clipping result. VESdk delivers the final smart clipping result to the application, such that the application presents a preview of the smart clipping result.

From the above exemplary implementation shown in FIG. 8 according to the embodiments of the present disclosure, it can be seen that the music file is processed according to the set music analysis algorithm, the videos are processed according to the set video algorithm, and the original multiple videos are cropped and subject to other operations, so as to obtain the target video having the best effect, improve the efficiency and effect of producing the beat sync video, and reduce the production cost.

According to one or more embodiments of the present disclosure, a video processing method is provided, the method including:
    obtaining video materials;
    obtaining an audio material;
    determining music points of the audio material, and extracting a video segment from each of the video materials according to the music points;
    splicing extracted video segments to obtain a synthesized video; and
    adding the audio material to an audio track of the synthesized video to obtain a target video.

In some embodiments, the determining music points of the audio material, and extracting a video segment from each of the video materials according to the music points includes:
    determining beat points and note starting points in the audio material, and combining and de-duplicating the beat points and the note starting points to obtain the music points;
    updating the music points according to the number of the video materials, and determining time intervals between adjacent music points as music intervals;
    extracting, from each of the video materials, a video segment corresponding to one of the music intervals.

In some embodiments, the extracting, from each of the video materials, a video segment corresponding to one of the music intervals includes:
    extracting at least one candidate video segment from each of the video materials according to the music intervals;
    selecting one of the at least one candidate video segment extracted from each of the video materials, and stitching selected candidate video segments to obtain a combined segment, until candidate video segments extracted from the video materials are traversed to obtain all possible combined segments;
    determining a score of each of the combined segments; and
    determining one of the combined segments with a highest score, and determining candidate video segments in the combined segment as video segments to be spliced to obtain the synthesized video.

In some embodiments, the extracting at least one candidate video segment from each of the video materials according to the music intervals includes:
    for each of the video materials, traversing candidate video segments having durations meeting one of the music intervals;

determining scores of the candidate video segments in the video material; and extracting at least one candidate video segment that meets a set score condition from the video material.

In some embodiments, before the selecting one of the at least one candidate video segment extracted from each of the video materials, and stitching selected candidate video segments to obtain a combined segment, the method further includes:

in a case that the candidate video segment does not match one of the music intervals corresponding to the candidate video segment, adjusting a frame rate of the candidate video segment, to cause a duration of the candidate video segment having the adjusted frame rate to be consistent with the music interval.

In some embodiments, the updating the music points according to the number of the video materials includes:

in a case that the number of the music points is consistent with the number of the video materials, keeping the music points unchanged;

in a case that the number of the music points is less than the number of the video materials, adding a new music point to the music points; and in a case that the number of the music points is greater than the number of the video materials, pruning the music points.

In the above solution, before the combining and de-duplicating the beat points and the note starting points, the method further includes:

determining a sound intensity of each of the beat points, and filtering out a beat point having a sound intensity lower than a sound intensity threshold.

In some embodiments, the obtaining video materials includes:

in response to a selection operation for candidate video materials, in a case that a duration of a selected candidate video material is out of a duration limitation range, presenting a prompt of duration limitation range not satisfied, and continuing to receive a new selection operation; and in a case that a duration of a selected candidate video material is within a duration limitation range, determining the candidate video material as the video material for extracting the video segment.

In some embodiments, the obtaining a video material includes:

determining the number of music points of each of at least two candidate audio materials; and determining one of the candidate audio materials of which the number of music points corresponds to the number of the video materials as the audio material to be added to the audio track of the synthesized video.

In some embodiments, after the adding the audio material to an audio track of the synthesized video to obtain a target video, the method further includes:

in response to a replacement operation for a video segment in the target video, replacing the video segment with a selected video segment in a corresponding video material, where the replaced video segment has a same duration as the selected video segment;

in response to an operation of adding a video material, generating a new target video based on the audio material, the newly added video material, and the video materials corresponding to the target video;

in response to the operation of deleting a video material, deleting a video material that is selected and that corresponds to the target video, and generating a new target video based on the audio material and video materials corresponding to the target video except for the deleted video material; and in response to an operation of updating an order of some video materials, updating the order of the video materials corresponding to the target video, and generating a new target video based on the audio material and the video materials in the updated order.

In some embodiments, after the obtaining an audio material, the method further includes:

in a case that a total duration of the video materials is less than or equal to a duration of the audio material, cropping the audio material according to the total duration of the video materials, to cause the duration of the audio material to be less than the total duration of the video materials.

In some embodiments, the splicing extracted video segments to obtain a synthesized video includes:

in a case that, in the extracted video segments, the number of horizontal video segments is greater than or equal to the number of vertical video segments, adding a background to each of the vertical video segments, and splicing the extracted video segments to obtain the synthesized video; and in a case that, in the extracted video segments, the number of vertical video segments is greater than the number of horizontal video segments, trimming frames of each of the horizontal video segments, and splicing the extracted video segments to obtain the synthesized video.

In some embodiments, the obtaining video materials includes:

obtaining at least two video materials submitted by a user; or obtaining a selected video material, and cropping the selected video material into at least two video materials.

According to one or more embodiments of the present disclosure, a video processing apparatus is provided, which includes:

a video obtaining unit, configured to obtain video materials;

an audio obtaining unit, configured to obtain an audio material;

a music point determination unit, configured to determine music points of the audio material, and extract a video segment from each of the video materials according to the music points;

a splicing unit, configured to splice extracted video segments to obtain a synthesized video; and an audio adding unit, configured to add the audio material to an audio track of the synthesized video to obtain a target video.

In some embodiments, the music point determination unit is further configured to:

determine beat points and note starting points in the audio material, and combine and de-duplicate the beat points and the note starting points to obtain the music points;

update the music points according to the number of the video materials, and determine time intervals between adjacent music points as music intervals;

extract, from each of the video materials, a video segment corresponding to one of the music intervals.

In some embodiments, the extracting, from each of the video materials, a video segment corresponding to one of the music intervals includes:

extracting at least one candidate video segment from each of the video materials according to the music intervals;

selecting one of the at least one candidate video segment extracted from each of the video materials, and stitching selected candidate video segments to obtain a combined segment, until candidate video segments extracted from the video materials are traversed to obtain all possible combined segments;

determining a score of each of the combined segments; and determining one of the combined segments with a highest score, and determining candidate video segments in the combined segment as video segments to be spliced to obtain the synthesized video.

In some embodiments, the extracting at least one candidate video segment from each of the video materials according to the music intervals includes:

for each of the video materials, traversing candidate video segments having durations meeting one of the music intervals;

determining scores of the candidate video segments in the video material; and extracting at least one candidate video segment that meets a set score condition from the video material.

In some embodiments, before the selecting one of the at least one candidate video segment extracted from each of the video materials, and stitching selected candidate video segments to obtain a combined segment, the apparatus is further configured to:

in a case that the candidate video segment does not match one of the music intervals corresponding to the candidate video segment, adjust a frame rate of the candidate video segment, to cause a duration of the candidate video segment having the adjusted frame rate to be consistent with the music interval.

In some embodiments, the updating the music points according to the number of the video materials includes:

in a case that the number of the music points is consistent with the number of the video materials, keeping the music points unchanged;

in a case that the number of the music points is less than the number of the video materials, adding a new music point to the music points; and in a case that the number of the music points is greater than the number of the video materials, pruning the music points.

In some embodiments, before the combining and de-duplicating the beat points and the note starting points, the apparatus is further configured to:

determine a sound intensity of each of the beat points, and filter out a beat point having a sound intensity lower than a sound intensity threshold.

In some embodiments, the video obtaining unit is further configured to:

in response to a selection operation for candidate video materials, in a case that a duration of a selected candidate video material is out of a duration limitation range, present a prompt of duration limitation range not satisfied, and continue to receive a new selection operation; and in a case that a duration of a selected candidate video material is within a duration limitation range, determine the candidate video material as the video material for extracting the video segment.

In some embodiments, the audio obtaining unit is further configured to:

determine the number of music points of each of at least two candidate audio materials; and determine one of the candidate audio materials of which the number of music points corresponds to the number of the video materials as the audio material to be added to the audio track of the synthesized video.

In some embodiments, the video processing apparatus further includes:

a first response unit configured to, in response to a replacement operation for a video segment in the target video, replace the video segment with a selected video segment in a corresponding video material, where the replaced video segment has a same duration as the selected video segment;

a second response unit configured to, in response to an operation of adding a video material, generate a new target video based on the audio material, the newly added video material, and the video materials corresponding to the target video;

a third response unit configured to, in response to the operation of deleting a video material, delete a video material that is selected and that corresponds to the target video, and generate a new target video based on the audio material and video materials corresponding to the target video except for the deleted video material; and a fourth response unit configured to, in response to an operation of updating an order of some video materials, update the order of the video materials corresponding to the target video, and generate a new target video based on the audio material and the video materials in the updated order.

In some embodiments, the video processing apparatus further includes:

an audio material cropping unit configured to, in a case that a total duration of the video materials is less than or equal to a duration of the audio material, cropping the audio material according to the total duration of the video materials, to cause the duration of the audio material to be less than the total duration of the video materials.

In some embodiments, the splicing unit is further configured to:

in a case that, in the extracted video segments, the number of horizontal video segments is greater than or equal to the number of vertical video segments, add a background to each of the vertical video segments, and splice the extracted video segments to obtain the synthesized video; and in a case that, in the extracted video segments, the number of vertical video segments is greater than the number of horizontal video segments, trim frames of each of the horizontal video segments, and splice the extracted video segments to obtain the synthesized video.

In some embodiments, the video obtaining unit is further configured to:

obtain at least two video materials submitted by a user; or obtain a selected video material, and cropping the selected video material into at least two video materials.

According to one or more embodiments of the present disclosure, an electronic device is provided, which includes:

a memory, configured to store executable instructions; and a processors configured to execute the executable instructions to perform the video processing method according to the embodiments of the present disclosure.

According to one or more embodiments of the present disclosure, a storage medium is provided. The storage medium is configured to store executable instructions, and the executable instructions are configured to perform the video processing method according to the embodiments of the present disclosure when executed.

The above are only preferred embodiments of the present disclosure and are illustrative of the technical principles applied in the present disclosure. It should be understood by those skilled in the art that the scope of the present disclosure is not limited to the above technical solutions formed by a specific combination of technical features, and also encompasses other technical solutions formed by any combination of the above technical features or equivalent features thereof, without departing from the inventive concept of the present disclosure, for example, technical solutions formed by replacing the above features and the technical features disclosed in present disclosure (but not limited to) with similar functions.

In addition, although the operations are depicted in a specific order, it should not be understood as these operations are required to be performed in the specific order shown or performed in a sequential order. Under certain circumstances, multitasking and parallel processing may be advantageous. Likewise, although several specific implementation details are included in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable sub-combination.

Although the subject matter has been described in language specific to structural features and/or method logical actions, it should be understood that the subject matter defined in the appended claims is not necessarily limited to the specific features or actions described above. On the contrary, the specific features and actions described above are merely exemplary forms of implementing the claims.

The invention claimed is:

1. A video processing method, comprising:
obtaining video materials;
obtaining an audio material;
determining music points of the audio material, and extracting a video segment from each of the video materials according to the music points, wherein the determining music points of the audio material, and extracting a video segment from each of the video materials according to the music points further comprises:
    determining beat points and note starting points in the audio material,
    combining and de-duplicating the beat points and the note starting points to obtain the music points, wherein the combining and de-duplicating the beat points and the note starting points to obtain the music points further comprises:
        analyzing the audio material using a beat analysis algorithm to obtain the beat points in the audio material and timestamps of the beat points,
        performing a short-time spectrum analysis on the audio material to obtain the note starting points in the audio material and timestamps of the note starting points, and
        de-duplicating the beat points and the note starting points based on the timestamps of the beat points and the timestamps of the not starting points to obtain the music points,
    updating the music points according to a number of the video materials,
    determining time intervals between adjacent music points as music intervals, and
    extracting, from each of the video materials, a video segment corresponding to one of the music intervals;
splicing extracted video segments to obtain a synthesized video; and
adding the audio material to an audio track of the synthesized video to obtain a target video.

2. The video processing method according to claim 1, wherein the extracting, from each of the video materials, a video segment corresponding to one of the music intervals comprises:
extracting at least one candidate video segment from each of the video materials according to the music intervals;
selecting one of the at least one candidate video segment extracted from each of the video materials, and splicing selected candidate video segments to obtain a combined segment, until candidate video segments extracted from the video materials are traversed to obtain all possible combined segments;
determining a score of each of the combined segments; and
determining one of the combined segments with a highest score, and determining candidate video segments in the combined segment as video segments to be spliced to obtain the synthesized video.

3. The video processing method according to claim 2, wherein the extracting at least one candidate video segment from each of the video materials according to the music intervals comprises:
for each of the video materials, traversing candidate video segments having durations meeting one of the music intervals;
determining scores of the candidate video segments in the video material; and
extracting at least one candidate video segment that meets a set score condition from the video material.

4. The video processing method according to claim 2, wherein before the selecting one of the at least one candidate video segment extracted from each of the video materials, and stitching selected candidate video segments to obtain a combined segment, the method further comprises:
in a case that the candidate video segment does not match one of the music intervals corresponding to the candidate video segment, adjusting a frame rate of the candidate video segment, to cause a duration of the candidate video segment having the adjusted frame rate to be consistent with the music interval.

5. The video processing method according to claim 1, wherein the updating the music points according to the number of the video materials comprises:
in a case that the number of the music points is consistent with the number of the video materials, keeping the music points unchanged;
in a case that the number of the music points is less than the number of the video materials, adding a new music point to the music points; and
in a case that the number of the music points is greater than the number of the video materials, pruning the music points.

6. The video processing method according to claim 1, wherein before the combining and de-duplicating the beat points and the note starting points, the method further comprises:
  determining a sound intensity of each of the beat points, and filtering out a beat point having a sound intensity lower than a sound intensity threshold.

7. The video processing method according to claim 1, wherein the obtaining video materials comprises:
  in response to a selection operation for candidate video materials, in a case that a duration of a selected candidate video material is out of a duration limitation range, presenting a prompt of duration limitation range not satisfied, and continuing to receive a new selection operation; and
  in a case that a duration of a selected candidate video material is within a duration limitation range, determining the candidate video material as the video material for extracting the video segment.

8. The video processing method according to claim 1, wherein the obtaining an audio material comprises:
  determining the number of music points of each of at least two candidate audio materials; and
  determining one of the candidate audio materials of which the number of music points corresponds to the number of the video materials as the audio material to be added to the audio track of the synthesized video.

9. The video processing method according to claim 1, wherein after the adding the audio material to an audio track of the synthesized video to obtain a target video, the method further comprises:
  in response to a replacement operation for a video segment in the target video, replacing the video segment with a selected video segment in a corresponding video material, wherein the replaced video segment has a same duration as the selected video segment;
  in response to an operation of adding a video material, generating a new target video based on the audio material, the newly added video material, and the video materials corresponding to the target video;
  in response to the operation of deleting a video material, deleting a video material that is selected and that corresponds to the target video, and generating a new target video based on the audio material and video materials corresponding to the target video except for the deleted video material; and
  in response to an operation of updating an order of some video materials, updating the order of the video materials corresponding to the target video, and generating a new target video based on the audio material and the video materials in the updated order.

10. The video processing method according to claim 1, wherein after the obtaining an audio material, the method further comprises:
  in a case that a total duration of the video materials is less than or equal to a duration of the audio material, cropping the audio material according to the total duration of the video materials, to cause the duration of the audio material to be less than the total duration of the video materials.

11. The video processing method according to claim 1, wherein the splicing extracted video segments to obtain a synthesized video comprises:
  in a case that, in the extracted video segments, the number of horizontal video segments is greater than or equal to the number of vertical video segments, adding a background to each of the vertical video segments, and splicing the extracted video segments to obtain the synthesized video; and
  in a case that, in the extracted video segments, the number of vertical video segments is greater than the number of horizontal video segments, trimming frames of each of the horizontal video segments, and splicing the extracted video segments to obtain the synthesized video.

12. The video processing method according to claim 1, wherein the obtaining video materials comprises:
  obtaining at least two video materials submitted by a user; or
  obtaining a selected video material, and cropping the selected video material into at least two video materials.

13. A video processing apparatus, comprising:
  at least one processor; and
  at least one memory communicatively coupled to the at least one processor and storing instructions that upon execution by the at least one processor cause the apparatus to:
  obtain video materials;
  obtain an audio material;
  determine music points of the audio material, and extract a video segment from each of the video materials according to the music points, wherein determining music points of the audio material, and extracting a video segment from each of the video materials according to the music points comprises:
    determining beat points and note starting points in the audio material,
    combining and de-duplicating the beat points and the note starting points to obtain the music points, wherein the combining and de-duplicating the beat points and the note starting points to obtain the music points further comprises:
      analyzing the audio material using a beat analysis algorithm to obtain the beat points in the audio material and timestamps of the beat points,
      performing a short-time spectrum analysis on the audio material to obtain the note starting points in the audio material and timestamps of the note starting points, and
      de-duplicating the beat points and the note starting points based on the timestamps of the beat points and the timestamps of the not starting points to obtain the music points,
    updating the music points according to a number of the video materials,
    determining time intervals between adjacent music points as music intervals, and
    extracting, from each of the video materials, a video segment based on one of the music intervals;
  splice extracted video segments to obtain a synthesized video; and
  add the audio material to an audio track of the synthesized video to obtain a target video.

14. The apparatus of claim 13 the at least one memory further storing instructions that upon execution by the at least one processor cause the apparatus to:
  extract at least one candidate video segment from each of the video materials according to the music intervals;
  select one of the at least one candidate video segment extracted from each of the video materials, and splicing selected candidate video segments to obtain a combined segment, until candidate video segments extracted from the video materials are traversed to obtain all possible combined segments;
determine a score of each of the combined segments; and
determine one of the combined segments with a highest score, and determining candidate video segments in the combined segment as video segments to be spliced to obtain the synthesized video.

15. The apparatus of claim 14, the at least one memory further storing instructions that upon execution by the at least one processor cause the apparatus to:
for each of the video materials, traverse candidate video segments having durations meeting one of the music intervals;
determine scores of the candidate video segments in the video material; and
extract at least one candidate video segment that meets a set score condition from the video material.

16. The apparatus of claim 14, the at least one memory further storing instructions that upon execution by the at least one processor cause the apparatus to:
in a case that the candidate video segment does not match one of the music intervals corresponding to the candidate video segment, adjust a frame rate of the candidate video segment, to cause a duration of the candidate video segment having the adjusted frame rate to be consistent with the music interval.

17. The apparatus of claim 13, the at least one memory further storing instructions that upon execution by the at least one processor cause the apparatus to:
in a case that the number of the music points is consistent with the number of the video materials, keep the music points unchanged;
in a case that the number of the music points is less than the number of the video materials, add a new music point to the music points; and
in a case that the number of the music points is greater than the number of the video materials, prune the music points.

18. A non-transitory computer readable storage medium, wherein the storage medium is configured to store executable instructions, and the executable instructions are configured to perform operations comprising:
obtaining video materials;
obtaining an audio material;
determining music points of the audio material, and extracting a video segment from each of the video materials according to the music points, wherein the determining music points of the audio material, and extracting a video segment from each of the video materials according to the music points further comprises:
determining beat points and note starting points in the audio material,
combining and de-duplicating the beat points and the note starting points to obtain the music points, wherein the combining and de-duplicating the beat points and the note starting points to obtain the music points further comprises:
analyzing the audio material using a beat analysis algorithm to obtain the beat points in the audio material and timestamps of the beat points,
performing a short-time spectrum analysis on the audio material to obtain the note starting points in the audio material and timestamps of the note starting points, and
de-duplicating the beat points and the note starting points based on the timestamps of the beat points and the timestamps of the not starting points to obtain the music points,
updating the music points according to a number of the video materials,
determining time intervals between adjacent music points as music intervals, and
extracting, from each of the video materials, a video segment based on one of the music intervals;
splicing extracted video segments to obtain a synthesized video; and
adding the audio material to an audio track of the synthesized video to obtain a target video.

\* \* \* \* \*